(12) United States Patent
Chen et al.

(10) Patent No.: US 10,546,438 B2
(45) Date of Patent: Jan. 28, 2020

(54) APPARATUS, METHOD AND ARTICLE FOR PROVIDING VEHICLE DIAGNOSTIC DATA

(71) Applicant: Gogoro Inc., Hong Kong (CN)

(72) Inventors: Ching Chen, Taipei (TW); Hok-Sum Horace Luke, Mercer Island, WA (US); Matthew Whiting Taylor, North Bend, WA (US); Yi-Tsung Wu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 155 days.

(21) Appl. No.: 15/860,615

(22) Filed: Jan. 2, 2018

(65) Prior Publication Data

US 2018/0272990 A1   Sep. 27, 2018

Related U.S. Application Data

(60) Continuation of application No. 14/179,442, filed on Feb. 12, 2014, now abandoned, which is a division of
(Continued)

(51) Int. Cl.
  *B60R 25/04* (2013.01)
  *G06Q 30/02* (2012.01)
  (Continued)

(52) U.S. Cl.
  CPC .............. *G07C 5/0858* (2013.01); *B60L 1/00* (2013.01); *B60L 3/003* (2013.01); *B60L 3/0046* (2013.01);
  (Continued)

(58) Field of Classification Search
  CPC ........ B60L 53/00; B60L 53/10; B60L 53/126; B60L 53/30; B60L 53/305; B60L 53/50;
  (Continued)

(56) References Cited

U.S. PATENT DOCUMENTS

| 1,387,848 A | 8/1921 | Good |
| 3,470,974 A | 10/1969 | Pefine |

(Continued)

FOREIGN PATENT DOCUMENTS

| CA | 2865976 | 9/2013 |
| CN | 1211844 | 3/1999 |

(Continued)

OTHER PUBLICATIONS

"Inrunner," retreived from URL=http://en.wikipedia.org/w/index.php?title=Inrunner&printable=yes on Sep. 28, 2011, 1 page.
(Continued)

*Primary Examiner* — Thomas G Black
*Assistant Examiner* — Sara J Lewandroski
(74) *Attorney, Agent, or Firm* — Perkins Coie LLP

(57) ABSTRACT

A network of collection, charging and distribution machines collects, charges and distributes portable electrical energy storage devices (e.g., batteries, supercapacitors or ultracapacitors). Vehicle diagnostic data of a vehicle using the portable electrical energy storage device is stored on a diagnostic data storage system of the portable electrical energy storage device during use of a respective portable electrical energy storage device by a respective vehicle. Once the user places the portable electrical energy storage device in the collection, charging and distribution machine, or comes within wireless communications range of a collection, charging and distribution machine, a connection is established between the collection, charging and distribution machine and the portable electrical energy storage device. The collection, charging and distribution machine then reads vehicle diagnostic data stored on the diagnostic data storage system of the portable electrical energy storage device and provides information regarding the diagnostic data.

20 Claims, 9 Drawing Sheets

Related U.S. Application Data application No. 14/022,134, filed on Sep. 9, 2013, now Pat. No. 8,862,304, which is a continuation of application No. 13/559,390, filed on Jul. 26, 2012, now Pat. No. 8,996,212.

(60) Provisional application No. 61/647,936, filed on May 16, 2012, provisional application No. 61/647,941, filed on May 16, 2012, provisional application No. 61/601,949, filed on Feb. 22, 2012, provisional application No. 61/601,953, filed on Feb. 22, 2012, provisional application No. 61/601,404, filed on Feb. 21, 2012, provisional application No. 61/581,566, filed on Dec. 29, 2011, provisional application No. 61/557,170, filed on Nov. 8, 2011, provisional application No. 61/534,772, filed on Sep. 14, 2011, provisional application No. 61/534,753, filed on Sep. 14, 2011, provisional application No. 61/534,761, filed on Sep. 14, 2011, provisional application No. 61/511,887, filed on Jul. 26, 2011, provisional application No. 61/511,880, filed on Jul. 26, 2011, provisional application No. 61/511,900, filed on Jul. 26, 2011.

(51) Int. Cl.

| | | |
|---|---|---|
| *G07C 5/08* | (2006.01) | |
| *H02J 7/00* | (2006.01) | |
| *H01M 10/42* | (2006.01) | |
| *H01M 10/44* | (2006.01) | |
| *H01M 10/48* | (2006.01) | |
| *B60L 15/20* | (2006.01) | |
| *B60L 3/00* | (2019.01) | |
| *B60L 7/06* | (2006.01) | |
| *B60L 7/14* | (2006.01) | |
| *B60L 7/22* | (2006.01) | |
| *B60L 50/50* | (2019.01) | |
| *B60L 53/14* | (2019.01) | |
| *B60L 50/40* | (2019.01) | |
| *B60L 50/51* | (2019.01) | |
| *B60L 53/80* | (2019.01) | |
| *B60L 53/30* | (2019.01) | |
| *B60L 55/00* | (2019.01) | |
| *B60L 53/65* | (2019.01) | |
| *B60L 53/66* | (2019.01) | |
| *B60L 53/10* | (2019.01) | |
| *B60L 58/10* | (2019.01) | |
| *B60L 58/16* | (2019.01) | |
| *B60L 58/12* | (2019.01) | |
| *B60L 58/21* | (2019.01) | |
| *B60L 58/26* | (2019.01) | |
| *B60L 50/60* | (2019.01) | |
| *B60L 50/64* | (2019.01) | |
| *B60L 53/68* | (2019.01) | |
| *G07C 5/00* | (2006.01) | |
| *G01C 21/34* | (2006.01) | |
| *H02J 4/00* | (2006.01) | |
| *G06Q 10/02* | (2012.01) | |
| *G06F 3/06* | (2006.01) | |
| *B60L 1/00* | (2006.01) | |
| *E05B 47/00* | (2006.01) | |
| *E05B 81/04* | (2014.01) | |
| *G05B 19/05* | (2006.01) | |
| *G07C 9/00* | (2006.01) | |
| *B60L 3/12* | (2006.01) | |
| *G05F 1/66* | (2006.01) | |
| *G06Q 30/06* | (2012.01) | |
| *G01C 21/36* | (2006.01) | |
| *G07F 15/00* | (2006.01) | |
| *G07F 17/00* | (2006.01) | |
| *G07F 17/12* | (2006.01) | |

(52) U.S. Cl.
CPC ............ *B60L 3/0061* (2013.01); *B60L 3/0069* (2013.01); *B60L 3/12* (2013.01); *B60L 7/06* (2013.01); *B60L 7/14* (2013.01); *B60L 7/22* (2013.01); *B60L 15/2045* (2013.01); *B60L 50/40* (2019.02); *B60L 50/50* (2019.02); *B60L 50/51* (2019.02); *B60L 50/64* (2019.02); *B60L 50/66* (2019.02); *B60L 53/11* (2019.02); *B60L 53/14* (2019.02); *B60L 53/30* (2019.02); *B60L 53/305* (2019.02); *B60L 53/65* (2019.02); *B60L 53/665* (2019.02); *B60L 53/68* (2019.02); *B60L 53/80* (2019.02); *B60L 55/00* (2019.02); *B60L 58/10* (2019.02); *B60L 58/12* (2019.02); *B60L 58/16* (2019.02); *B60L 58/21* (2019.02); *B60L 58/26* (2019.02); *B60R 25/04* (2013.01); *E05B 47/0001* (2013.01); *E05B 81/04* (2013.01); *G01C 21/3476* (2013.01); *G01C 21/3682* (2013.01); *G05B 19/05* (2013.01); *G05F 1/66* (2013.01); *G06F 3/0638* (2013.01); *G06F 3/0671* (2013.01); *G06Q 10/02* (2013.01); *G06Q 30/0253* (2013.01); *G06Q 30/0259* (2013.01); *G06Q 30/0261* (2013.01); *G06Q 30/0267* (2013.01); *G06Q 30/0639* (2013.01); *G07C 5/00* (2013.01); *G07C 9/00309* (2013.01); *G07F 15/003* (2013.01); *G07F 15/005* (2013.01); *G07F 15/006* (2013.01); *G07F 17/0042* (2013.01); *G07F 17/12* (2013.01); *H01M 10/425* (2013.01); *H01M 10/4257* (2013.01); *H01M 10/441* (2013.01); *H01M 10/482* (2013.01); *H02J 4/00* (2013.01); *H02J 7/00* (2013.01); *H02J 7/007* (2013.01); *H02J 7/0013* (2013.01); *H02J 7/0021* (2013.01); *H02J 7/0027* (2013.01); *B60L 2200/12* (2013.01); *B60L 2200/24* (2013.01); *B60L 2210/12* (2013.01); *B60L 2210/14* (2013.01); *B60L 2210/30* (2013.01); *B60L 2220/16* (2013.01); *B60L 2220/46* (2013.01); *B60L 2240/14* (2013.01); *B60L 2240/427* (2013.01); *B60L 2240/429* (2013.01); *B60L 2240/525* (2013.01); *B60L 2240/545* (2013.01); *B60L 2240/622* (2013.01); *B60L 2240/662* (2013.01); *B60L 2240/70* (2013.01); *B60L 2250/22* (2013.01); *B60L 2260/44* (2013.01); *B60L 2260/52* (2013.01); *B60L 2270/46* (2013.01); *G05B 2219/15048* (2013.01); *G05B 2219/15053* (2013.01); *G07C 2009/00769* (2013.01); *H01M 2010/4271* (2013.01); *H01M 2010/4278* (2013.01); *H01M 2220/20* (2013.01); *H01M 2220/30* (2013.01); *H02J 2007/0001* (2013.01); *H02J 2007/0098* (2013.01); *Y02E 60/12* (2013.01); *Y02E 60/721* (2013.01); *Y02T 10/645* (2013.01); *Y02T 10/7005* (2013.01); *Y02T 10/705* (2013.01); *Y02T 10/7011* (2013.01); *Y02T 10/7022* (2013.01); *Y02T 10/7044* (2013.01); *Y02T 10/7055* (2013.01); *Y02T 10/7072* (2013.01); *Y02T 10/7088* (2013.01); *Y02T 10/7094* (2013.01); *Y02T 10/7225* (2013.01); *Y02T 10/7233* (2013.01); *Y02T 10/7241*

(2013.01); *Y02T 10/7258* (2013.01); *Y02T 10/7283* (2013.01); *Y02T 10/92* (2013.01); *Y02T 90/121* (2013.01); *Y02T 90/124* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 50/10* (2013.01); *Y10T 70/7062* (2015.04); *Y10T 307/406* (2015.04)

(58) Field of Classification Search
CPC .......... B60L 53/51; B60L 53/52; B60L 53/53; B60L 53/54; B60L 53/55; B60L 53/56; B60L 53/57; B60L 53/60; B60L 53/62; B60L 53/65; B60L 53/66; B60L 53/665; B60L 53/68; B60L 53/80; B60L 50/50; B60L 50/60; B60L 50/61; B60L 50/64; B60L 58/00; B60L 58/10; G07C 5/0858; G07C 5/0883

See application file for complete search history.

(56) References Cited

U.S. PATENT DOCUMENTS

| | | | |
|---|---|---|---|
| 3,664,450 A | 5/1972 | Udden et al. | |
| 3,678,455 A | 7/1972 | Levey | |
| 3,687,484 A | 8/1972 | Cosby | |
| 3,708,028 A | 1/1973 | Hafer | |
| 4,087,895 A | 5/1978 | Etienne | |
| 4,129,759 A | 12/1978 | Hug | |
| 4,216,839 A | 8/1980 | Gould et al. | |
| 4,669,570 A | 6/1987 | Perret | |
| 4,989,146 A | 1/1991 | Imajo | |
| 5,187,423 A | 2/1993 | Marton | |
| 5,189,325 A | 2/1993 | Jarczynski | |
| 5,236,069 A | 8/1993 | Peng | |
| 5,339,250 A | 8/1994 | Durbin | |
| 5,349,535 A * | 9/1994 | Gupta | H01M 10/48 702/63 |
| 5,376,869 A | 12/1994 | Konrad | |
| 5,491,486 A | 2/1996 | Welles, II et al. | |
| 5,544,784 A | 8/1996 | Malaspina | |
| 5,596,261 A * | 1/1997 | Suyama | B60L 58/12 320/152 |
| 5,627,752 A | 5/1997 | Buck et al. | |
| 5,631,536 A * | 5/1997 | Tseng | B60L 53/305 320/137 |
| 5,642,270 A | 6/1997 | Green et al. | |
| 5,815,824 A | 9/1998 | Saga et al. | |
| 5,839,800 A | 11/1998 | Koga et al. | |
| 5,898,282 A | 4/1999 | Drozdz et al. | |
| 5,998,963 A | 12/1999 | Aarseth | |
| 6,016,882 A | 1/2000 | Ishikawa | |
| 6,154,006 A | 11/2000 | Hatanaka et al. | |
| 6,177,867 B1 * | 1/2001 | Simon | G08C 17/02 340/12.5 |
| 6,177,879 B1 | 1/2001 | Kokubu et al. | |
| 6,236,333 B1 | 5/2001 | King | |
| 6,403,251 B1 | 6/2002 | Baggaley et al. | |
| 6,429,622 B1 | 8/2002 | Svensson | |
| 6,494,279 B1 | 12/2002 | Hutchens | |
| 6,498,457 B1 | 12/2002 | Tsuboi | |
| 6,515,580 B1 | 2/2003 | Isoda et al. | |
| 6,583,592 B2 | 6/2003 | Omata et al. | |
| 6,593,713 B2 | 7/2003 | Morimoto et al. | |
| 6,614,204 B2 | 9/2003 | Pellegrino et al. | |
| 6,796,396 B2 | 9/2004 | Kamen et al. | |
| 6,822,560 B2 | 11/2004 | Geber et al. | |
| 6,854,773 B2 | 2/2005 | Lin | |
| 6,899,268 B2 | 5/2005 | Hara | |
| 6,917,306 B2 | 7/2005 | Lilja | |
| 6,952,795 B2 | 10/2005 | O'Gorman et al. | |
| 7,010,682 B2 | 3/2006 | Reinold et al. | |
| 7,111,179 B1 | 9/2006 | Girson et al. | |
| 7,131,005 B2 | 10/2006 | Levenson et al. | |
| 7,392,068 B2 | 6/2008 | Dayan et al. | |
| 7,415,332 B2 | 8/2008 | Ito et al. | |
| 7,426,910 B2 | 9/2008 | Elwart | |
| 7,495,543 B2 | 2/2009 | Denison et al. | |
| 7,567,166 B2 | 7/2009 | Bourgine De Meder | |
| 7,592,728 B2 | 9/2009 | Jones et al. | |
| 7,596,709 B2 | 9/2009 | Cooper et al. | |
| 7,617,893 B2 | 11/2009 | Syed et al. | |
| 7,630,181 B2 | 12/2009 | Wilk et al. | |
| 7,698,044 B2 | 4/2010 | Prakash et al. | |
| 7,728,548 B2 | 6/2010 | Daynes et al. | |
| 7,761,307 B2 | 7/2010 | Ochi et al. | |
| 7,778,746 B2 * | 8/2010 | McLeod | B60L 53/305 701/22 |
| 7,863,858 B2 | 1/2011 | Gangstoe et al. | |
| 7,868,591 B2 | 1/2011 | Phillips et al. | |
| 7,898,439 B2 | 3/2011 | Bettez et al. | |
| 7,908,020 B2 | 3/2011 | Pieronek | |
| 7,923,144 B2 | 4/2011 | Kohn et al. | |
| 7,948,207 B2 | 5/2011 | Scheucher | |
| 7,979,147 B1 | 7/2011 | Dunn | |
| 7,993,155 B2 | 8/2011 | Heichal et al. | |
| 8,006,793 B2 | 8/2011 | Heichal et al. | |
| 8,006,973 B2 | 8/2011 | Toba et al. | |
| 8,013,571 B2 | 9/2011 | Agassi et al. | |
| 8,035,341 B2 | 10/2011 | Genzel et al. | |
| 8,035,349 B2 | 10/2011 | Lubawy | |
| 8,063,762 B2 | 11/2011 | Sid | |
| 8,068,952 B2 | 11/2011 | Valentine et al. | |
| 8,098,050 B2 | 1/2012 | Takahashi | |
| 8,106,631 B2 | 1/2012 | Abe | |
| 8,118,132 B2 | 2/2012 | Gray, Jr. | |
| 8,164,300 B2 | 4/2012 | Agassi et al. | |
| 8,219,839 B2 | 7/2012 | Akimoto | |
| 8,229,625 B2 * | 7/2012 | Lal | B60R 16/023 701/36 |
| 8,265,816 B1 | 9/2012 | Lafrance | |
| 8,301,365 B2 | 10/2012 | Niwa et al. | |
| 8,319,605 B2 | 11/2012 | Hassan et al. | |
| 8,326,259 B2 | 12/2012 | Gautama et al. | |
| 8,354,768 B2 | 1/2013 | Cipriani | |
| 8,355,965 B2 | 1/2013 | Yamada | |
| 8,378,627 B2 | 2/2013 | Asada et al. | |
| 8,412,401 B2 * | 4/2013 | Bertosa | G07C 5/006 340/439 |
| 8,437,908 B2 * | 5/2013 | Goff | G01R 31/371 701/33.4 |
| 8,447,598 B2 | 5/2013 | Chutorash et al. | |
| 8,564,241 B2 | 10/2013 | Masuda | |
| 8,614,565 B2 | 12/2013 | Lubawy | |
| 8,725,135 B2 | 5/2014 | Weyl et al. | |
| 8,825,250 B2 | 9/2014 | Luke et al. | |
| 8,862,304 B2 | 10/2014 | Chen et al. | |
| 8,996,212 B2 | 3/2015 | Chen et al. | |
| 9,176,680 B2 | 11/2015 | Chen et al. | |
| 9,292,983 B2 | 3/2016 | Luke et al. | |
| 10,396,576 B2 * | 8/2019 | Penilla | B60L 50/52 |
| 2001/0018903 A1 | 9/2001 | Hirose et al. | |
| 2001/0052433 A1 | 12/2001 | Harris et al. | |
| 2002/0023789 A1 | 2/2002 | Morisawa et al. | |
| 2002/0070851 A1 * | 6/2002 | Raichle | G08G 1/20 340/438 |
| 2003/0052796 A1 | 3/2003 | Schmidt et al. | |
| 2003/0141840 A1 | 7/2003 | Sanders | |
| 2003/0163434 A1 | 8/2003 | Barends | |
| 2003/0209375 A1 * | 11/2003 | Suzuki | B60K 1/04 180/65.22 |
| 2004/0130292 A1 | 7/2004 | Buchanan et al. | |
| 2004/0236615 A1 | 11/2004 | Msndy | |
| 2004/0246119 A1 | 12/2004 | Martin et al. | |
| 2006/0047380 A1 * | 3/2006 | Welch | G07C 5/0808 701/33.4 |
| 2006/0208850 A1 | 9/2006 | Ikeuchi et al. | |
| 2006/0284601 A1 | 12/2006 | Salasoo et al. | |
| 2007/0026996 A1 | 2/2007 | Ayabe et al. | |
| 2007/0035397 A1 | 2/2007 | Patenaude et al. | |

(56) References Cited

U.S. PATENT DOCUMENTS

| | | |
|---|---|---|
| 2007/0069687 A1 | 3/2007 | Suzuki |
| 2007/0090921 A1 | 4/2007 | Fisher |
| 2007/0126395 A1 | 6/2007 | Suchar |
| 2007/0145945 A1 | 6/2007 | McGinley et al. |
| 2007/0159297 A1 | 7/2007 | Paulk et al. |
| 2007/0208468 A1 | 9/2007 | Sankaran et al. |
| 2007/0238164 A1 | 10/2007 | Kim |
| 2008/0143292 A1 | 6/2008 | Ward |
| 2008/0154801 A1 | 6/2008 | Fein et al. |
| 2008/0276110 A1 | 11/2008 | Indiani et al. |
| 2009/0024872 A1* | 1/2009 | Beverly ............ G06F 11/0748 714/25 |
| 2009/0033456 A1 | 2/2009 | Castillo et al. |
| 2009/0045773 A1 | 2/2009 | Pandya et al. |
| 2009/0082957 A1 | 3/2009 | Agassi et al. |
| 2009/0112394 A1* | 4/2009 | Lepejian ............ G07C 5/0808 701/29.5 |
| 2009/0158790 A1 | 6/2009 | Oliver |
| 2009/0198372 A1 | 8/2009 | Hammerslag |
| 2009/0240575 A1 | 9/2009 | Bettez et al. |
| 2009/0251300 A1 | 10/2009 | Yasuda et al. |
| 2009/0261779 A1 | 10/2009 | Zyren |
| 2009/0271067 A1* | 10/2009 | Underdal ............ G01M 15/02 701/33.4 |
| 2009/0294188 A1 | 12/2009 | Cole |
| 2010/0013433 A1 | 1/2010 | Baxter et al. |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0079115 A1 | 4/2010 | Lubawy |
| 2010/0089547 A1 | 4/2010 | King et al. |
| 2010/0094496 A1* | 4/2010 | Hershkovitz ............ B60L 3/12 701/22 |
| 2010/0114798 A1 | 5/2010 | Sirton |
| 2010/0114800 A1 | 5/2010 | Yasuda et al. |
| 2010/0134067 A1 | 6/2010 | Baxter et al. |
| 2010/0145717 A1 | 6/2010 | Hoeltzel |
| 2010/0161481 A1 | 6/2010 | Littrell |
| 2010/0188043 A1 | 7/2010 | Kelty et al. |
| 2010/0191585 A1 | 7/2010 | Smith |
| 2010/0198535 A1 | 8/2010 | Brown et al. |
| 2010/0198754 A1 | 8/2010 | Jones et al. |
| 2010/0201482 A1 | 8/2010 | Robertson et al. |
| 2010/0225266 A1 | 9/2010 | Hartman |
| 2010/0235043 A1 | 9/2010 | Seta et al. |
| 2010/0250043 A1 | 9/2010 | Scheucher |
| 2010/0308989 A1 | 12/2010 | Gasper |
| 2011/0025267 A1 | 2/2011 | Kamen et al. |
| 2011/0029157 A1 | 2/2011 | Muzaffer |
| 2011/0031929 A1 | 2/2011 | Asada et al. |
| 2011/0032110 A1 | 2/2011 | Taguchi |
| 2011/0071932 A1* | 3/2011 | Agassi ............ B60L 3/12 705/34 |
| 2011/0082598 A1 | 4/2011 | Boretto et al. |
| 2011/0082621 A1 | 4/2011 | Berkobin et al. |
| 2011/0084665 A1 | 4/2011 | White et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1* | 6/2011 | Gagosz ............ B62H 3/02 320/103 |
| 2011/0153141 A1 | 6/2011 | Beechie et al. |
| 2011/0156662 A1 | 6/2011 | Nakamura et al. |
| 2011/0160992 A1 | 6/2011 | Crombez |
| 2011/0169447 A1 | 7/2011 | Brown et al. |
| 2011/0191265 A1 | 8/2011 | Lowenthal et al. |
| 2011/0200193 A1 | 8/2011 | Blitz et al. |
| 2011/0202476 A1 | 8/2011 | Nagy et al. |
| 2011/0218703 A1 | 9/2011 | Uchida |
| 2011/0224868 A1 | 9/2011 | Collings, III et al. |
| 2011/0224900 A1 | 9/2011 | Hirota et al. |
| 2011/0241824 A1 | 10/2011 | Uesugi |
| 2011/0248668 A1 | 10/2011 | Davis et al. |
| 2011/0260691 A1 | 10/2011 | Ishibashi et al. |
| 2011/0270480 A1 | 11/2011 | Ishibashi et al. |
| 2011/0279257 A1 | 11/2011 | Au et al. |
| 2011/0282527 A1 | 11/2011 | Inbarajan et al. |
| 2011/0292667 A1 | 12/2011 | Meyers |
| 2011/0295454 A1 | 12/2011 | Meyers |
| 2011/0303509 A1* | 12/2011 | Agassi ............ B60K 1/04 198/604 |
| 2012/0000720 A1 | 1/2012 | Honda et al. |
| 2012/0013182 A1 | 1/2012 | Minegishi et al. |
| 2012/0019196 A1 | 1/2012 | Fung |
| 2012/0038473 A1* | 2/2012 | Fecher ............ G07C 5/008 340/455 |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0143410 A1 | 6/2012 | Gallagher et al. |
| 2012/0157083 A1 | 6/2012 | Otterson |
| 2012/0158229 A1 | 6/2012 | Schaefer |
| 2012/0167071 A1 | 6/2012 | Paek |
| 2012/0173292 A1 | 7/2012 | Solomon et al. |
| 2012/0194346 A1 | 8/2012 | Tsai et al. |
| 2012/0223575 A1 | 9/2012 | Hachiya et al. |
| 2012/0233077 A1 | 9/2012 | Tate, Jr. et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0280573 A1 | 11/2012 | 0hkura et al. |
| 2012/0296512 A1 | 11/2012 | Lee et al. |
| 2012/0299527 A1 | 11/2012 | Vo |
| 2012/0299537 A1 | 11/2012 | Kikuchi |
| 2012/0299721 A1 | 11/2012 | Jones |
| 2012/0316671 A1* | 12/2012 | Hammerslag ......... B60L 53/305 700/225 |
| 2012/0319649 A1 | 12/2012 | Billmaier |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0151293 A1 | 6/2013 | Karner et al. |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0221928 A1 | 8/2013 | Kelty et al. |
| 2013/0254097 A1 | 9/2013 | Marathe et al. |
| 2013/0282254 A1* | 10/2013 | Dwan ............ G07C 5/008 701/101 |
| 2014/0028089 A1 | 1/2014 | Luke et al. |
| 2014/0163813 A1 | 6/2014 | Chen et al. |
| 2014/0320046 A1 | 10/2014 | Luke et al. |
| 2014/0368032 A1 | 12/2014 | Doemdorfer |
| 2015/0042157 A1 | 2/2015 | Chen et al. |
| 2015/0046012 A1 | 2/2015 | Chen et al. |

(56) References Cited

U.S. PATENT DOCUMENTS

| | | | |
|---|---|---|---|
| 2015/0134142 A1 | 5/2015 | Taylor et al. | |
| 2015/0153967 A1 | 6/2015 | Chen et al. | |
| 2019/0152339 A1* | 5/2019 | Lowenthal | B60L 3/0046 |

FOREIGN PATENT DOCUMENTS

| | | |
|---|---|---|
| CN | 1877473 | 12/2006 |
| CN | 101395039 | 3/2009 |
| CN | 101417637 | 4/2009 |
| CN | 101950998 | 1/2011 |
| CN | 1294994 | 5/2011 |
| DE | 4432539 | 6/1995 |
| DE | 102007045633 | 4/2009 |
| EP | 0693813 | 1/1996 |
| EP | 0877342 | 11/1998 |
| EP | 1177955 | 2/2002 |
| EP | 1667306 | 6/2006 |
| EP | 2101390 | 9/2009 |
| EP | 2182575 | 5/2010 |
| EP | 2230146 | 9/2010 |
| EP | 2305510 | 4/2011 |
| EP | 2428939 | 3/2012 |
| JP | 5-135804 | 6/1993 |
| JP | 07-031008 | 1/1995 |
| JP | 7031008 | 1/1995 |
| JP | 7-36504 | 7/1995 |
| JP | 9-119839 | 5/1997 |
| JP | 10-170293 | 6/1998 |
| JP | 10-307952 | 11/1998 |
| JP | 11-049079 | 2/1999 |
| JP | 11-051681 | 2/1999 |
| JP | H1155869 | 2/1999 |
| JP | 11-176487 | 7/1999 |
| JP | 11-205914 | 7/1999 |
| JP | 2000-102102 | 4/2000 |
| JP | 2000-102103 | 4/2000 |
| JP | 2000-341868 | 12/2000 |
| JP | 2001-057711 | 2/2001 |
| JP | 2001-128301 | 5/2001 |
| JP | 2002-140398 | 5/2002 |
| JP | 2003-102110 | 4/2003 |
| JP | 2003-118397 | 4/2003 |
| JP | 2003-262525 | 9/2003 |
| JP | 2004-215468 | 7/2004 |
| JP | 2005-067453 | 3/2005 |
| JP | 2005-323455 | 11/2005 |
| JP | 2006-121874 | 5/2006 |
| JP | 2007-035479 | 2/2007 |
| JP | 2007-060353 | 3/2007 |
| JP | 2007-148590 | 6/2007 |
| JP | 2007-259600 | 10/2007 |
| JP | 2008-016229 | 1/2008 |
| JP | 2008-127894 | 6/2008 |
| JP | 2008-219953 | 9/2008 |
| JP | 2008-285075 | 11/2008 |
| JP | 2009-008609 | 1/2009 |
| JP | 2009-022069 | 1/2009 |
| JP | 2009-051203 | 3/2009 |
| JP | 2009-512035 | 3/2009 |
| JP | 2009-171646 | 7/2009 |
| JP | 2009-171647 | 7/2009 |
| JP | 4319289 | 8/2009 |
| JP | 2009-248888 | 10/2009 |
| JP | 2010-022148 | 1/2010 |
| JP | 2010-108833 | 5/2010 |
| JP | 2010-124634 | 6/2010 |
| JP | 2010-148246 | 7/2010 |
| JP | 2010-186238 | 8/2010 |
| JP | 2010-191636 | 9/2010 |
| JP | 2010-200405 | 9/2010 |
| JP | 2010-212048 | 9/2010 |
| JP | 2010-225528 | 10/2010 |
| JP | 2010-259238 | 11/2010 |
| JP | 2010-269686 | 12/2010 |
| JP | 2010-540907 | 12/2010 |
| JP | 2011-083166 | 4/2011 |
| JP | 2011-126452 | 6/2011 |
| JP | 2011-131631 | 7/2011 |
| JP | 2011-131805 | 7/2011 |
| JP | 2011-142704 | 7/2011 |
| JP | 2011-142779 | 7/2011 |
| JP | 2011-233470 | 11/2011 |
| JP | 2012-151916 | 8/2012 |
| JP | 2012-526409 | 10/2012 |
| JP | 2012-214060 | 11/2012 |
| KR | 1998-045020 | 9/1998 |
| KR | 2004-0005146 | 1/2004 |
| KR | 20100012401 | 2/2010 |
| KR | 10-0971278 | 7/2010 |
| KR | 20110004292 | 1/2011 |
| KR | 20110041783 | 4/2011 |
| KR | 20120020554 | 3/2012 |
| TW | 299933 | 3/1997 |
| TW | 439343 | 6/2001 |
| TW | 200836452 | 9/2008 |
| TW | M341625 | 10/2008 |
| TW | I315116 | 9/2009 |
| TW | M371880 | 1/2010 |
| TW | M379269 | 4/2010 |
| TW | M379789 | 5/2010 |
| TW | M385047 | 7/2010 |
| TW | 201043986 | 12/2010 |
| TW | 201044266 | 12/2010 |
| TW | 201328913 | 7/2013 |
| TW | I569992 | 2/2017 |
| WO | WO1998021132 | 5/1998 |
| WO | WO1999003186 | 1/1999 |
| WO | WO2010115573 | 1/1999 |
| WO | WO2009039454 | 3/2009 |
| WO | WO2010005052 | 1/2010 |
| WO | WO2010033517 | 3/2010 |
| WO | WO2010033881 | 3/2010 |
| WO | WO2010035605 | 4/2010 |
| WO | WO2010143483 | 12/2010 |
| WO | WO2011138205 | 11/2011 |
| WO | WO2012085992 | 6/2012 |
| WO | WO2012160407 | 11/2012 |
| WO | WO2012160557 | 11/2012 |
| WO | WO2013024483 | 2/2013 |
| WO | WO2013024484 | 2/2013 |
| WO | WO2013042216 | 3/2013 |
| WO | WO2013052785 | 4/2013 |
| WO | WO2013074819 | 5/2013 |
| WO | WO2013080211 | 6/2013 |
| WO | WO2013098873 | 7/2013 |
| WO | WO2013102894 | 7/2013 |
| WO | WO2013108246 | 7/2013 |
| WO | WO2013118113 | 8/2013 |
| WO | WO2013128007 | 9/2013 |
| WO | WO2013128009 | 9/2013 |
| WO | WO2013142154 | 9/2013 |
| WO | WO2013144951 | 10/2013 |

OTHER PUBLICATIONS

"Outrunner," retreived from URL=http://en.wikipedia.org/w/index.php?title=Outrunner&printable=yes on Sep. 16, 2011, 2 pages.

Chen et al., "Adjusting Electric Vehicle Systems Based on an Electrical Energy Storage Device Thermal Profile," U.S. Appl. No. 61/862,854, filed Aug. 6, 2013, 74 pages.

Chen et al., "Apparatus, Method and Article for Providing Vehicle Diagnostic Data," Notice of Allowance dated Jul. 9, 2014, for U.S. Appl. No. 14/022,134, 10 pages.

Chen et al., "Apparatus, Method and Article for Providing Vehicle Diagnostic Data," Notice of Allowance dated Jun. 23, 2015, for U.S. Appl. No. 14/609,201, 12 pages.

Chen et al., "Apparatus, Method and Article for Providing Vehicle Diagnostic Data," Notice of Allowance dated Nov. 3, 2014, for U.S. Appl. No. 13/559,390, 10 pages.

Chen et al., "Apparatus, Method and Article for Providing Vehicle Diagnostic Data," Office Action dated Apr. 9, 2014, for U.S. Appl. No. 14/022,134, 20 pages.

(56) References Cited

OTHER PUBLICATIONS

Chen et al., "Apparatus, Method and Article for Providing Vehicle Diagnostic Data," Office Action dated Dec. 30, 2013, for U.S. Appl. No. 14/022,134, 20 pages.
Chen et al., "Apparatus, Method and Article for Providing Vehicle Diagnostic Data," Office Action dated Jun. 18, 2014, for U.S. Appl. No. 13/559,390, 16 pages.
Chen et al., "Apparatus, Method and Article for Providing Vehicle Diagnostic Data," U.S. Appl. No. 14/022,134, filed Sep. 9, 2013, 61 pages.
Chen et al., "Apparatus, Method and Article for Providing Vehicle Diagnostic Data," U.S. Appl. No. 61/601,404, filed Feb. 21, 2012, 56 pages.
Chen et al., "Apparatus, System, and Method for Authentication of Vehicular Components ," U.S. Appl. No. 61/783,041, filed Mar. 14, 2013, 84 pages.
Chen et al., "Apparatus, System, and Method for Authentication of Vehicular Components," Notice of Allowance dated Mar. 25, 2014, for U.S. Appl. No. 13/918,703, 7 pages.
Chen et al., "Apparatus, System, and Method for Authentication of Vehicular Components," Office Action dated Nov. 22, 2013, for U.S. Appl. No. 13/918,703, 35 pages.
Chen et al., "Apparatus, System, and Method for Authentication of Vehicular Components," U.S. Appl. No. 13/918,703, filed Jun. 14, 2013, 84 pages.
Chen et al., "Systems and Methods for Powering Electric Vehicles Using a Single or Multiple Power Cells," U.S. Appl. No. 61/862,852, filed Aug. 6, 2013, 46 pages.
Chinese Office Action dated Jul. 30, 2015, for corresponding CN Application No. 201280047050.4, 12 pages.
Chinese Office Action with English Translation, dated Feb. 25, 2016, for corresponding CN Application No. 201280047050, 17 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12818447.0, dated Mar. 27, 2014, 3 pages.
English Translation of Japanese Office Action dated Feb. 17, 2015, for corresponding Japanese Patent Application No. 2014-523007, 7 pages.
Extended European Search Report dated Apr. 24, 2015, for corresponding EP Application No. 12817097.4, 9 pages.
Extended European Search Report dated Aug. 3, 2015, for corresponding EP Application No. 12817141.0, 9 pages.
Extended European Search Report dated Aug. 5, 2015, for corresponding EP Application No. 12817392.9, 17 pages.
Extended European Search Report dated Aug. 5, 2015, for corresponding EP Application No. 12817696.3, 13 pages.
Extended European Search Report dated Aug. 5, 2015, for corresponding EP Application No. 12818447.0, 17 pages.
Huang et al., "Apparatus, Method and Article for Vehicle Turn Signals," U.S. Appl. No. 14/079,894, filed Nov. 14, 2013, 41 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," Office Action dated May 14, 2015, for U.S. Appl. No. 14/079,894, 9 pages.
International Preliminary Report on Patentability and Written Opinion for corresponding International Patent Application No. PCT/US2012/048349, dated Jan. 28, 2014, 5 pages.
International Preliminary Report on Patentability and Written Opinion for corresponding International Patent Application No. PCT/US2012/048354, dated Jan. 28, 2014, 7 pages.
International Preliminary Report on Patentability and Written Opinion for corresponding International Patent Application No. PCT/US2012/048358, dated Jan. 28, 2014, 5 pages.
International Preliminary Report on Patentability and Written Opinion for corresponding International Patent Application No. PCT/US2012/048366, dated Jan. 28, 2014, 5 pages.
International Preliminary Report on Patentability and Written Opinion for corresponding International Patent Application No. PCT/US2012/048367, dated Jan. 28, 2014, 4 pages.
International Preliminary Report on Patentability and Written Opinion for corresponding International Patent Application No. PCT/US2012/048375, dated Jan. 28, 2014, 5 pages.
International Preliminary Report on Patentability and Written Opinion for corresponding International Patent Application No. PCT/US2012/048379, dated Jan. 28, 2014, 5 pages.
International Preliminary Report on Patentability and Written Opinion for corresponding International Patent Application No. PCT/US2012/048380, dated Jan. 28, 2014, 5 pages.
International Preliminary Report on Patentability and Written Opinion for corresponding International Patent Application No. PCT/US2012/048382, dated Jan. 28, 2014, 5 pages.
International Preliminary Report on Patentability and Written Opinion for corresponding International Patent Application No. PCT/US2012/048391, dated Jan. 28, 2014, 6 pages.
International Preliminary Report on Patentability and Written Opinion for corresponding International Patent Application No. PCT/US2013/070131, dated May 19, 2015, 13 pages.
International Search Report and Written Opinion for corresponding International Patent Application No. PCT/US2012/048349, dated Feb. 18, 2013, 9 pages.
International Search Report and Written Opinion for corresponding International Patent Application No. PCT/US2012/048354, dated Feb. 18, 2013, 11 pages.
International Search Report and Written Opinion for corresponding International Patent Application No. PCT/US2012/048358, dated Feb. 25, 2013, 9 pages.
International Search Report and Written Opinion for corresponding International Patent Application No. PCT/US2012/048366, dated Jan. 21, 2013, 10 pages.
International Search Report and Written Opinion for corresponding International Patent Application No. PCT/US2012/048367, dated Jan. 17, 2013, 8 pages.
International Search Report and Written Opinion for corresponding International Patent Application No. PCT/US2012/048375, dated Jan. 23, 2013, 9 pages.
International Search Report and Written Opinion for corresponding International Patent Application No. PCT/US2012/048379, dated Dec. 17, 2012, 9 pages.
International Search Report and Written Opinion for corresponding International Patent Application No. PCT/US2012/063979, dated Mar. 4, 2013, 10 pages.
International Search Report and Written Opinion for corresponding International Application No. PCT/US2012/048391, dated Dec. 21, 2012, 9 pages.
International Search Report and Written Opinion for corresponding International Application No. PCT/US2012/058930, dated Mar. 15, 2013, 11 pages.
International Search Report and Written Opinion for corresponding International Application No. PCT/US2012/059931, dated Mar. 29, 2013, 13 pages.
International Search Report and Written Opinion for corresponding International Application No. PCT/US2013/065704, dated Feb. 13, 2014, 13 pages.

(56) References Cited

OTHER PUBLICATIONS

International Search Report and Written Opinion for corresponding International Application No. PCT/US2013/070131, dated Feb. 19, 2014, 17 pages.
International Search Report and Written Opinion for corresponding International Application No. PCT/US2014/023539, dated Sep. 4, 2014, 12 pages.
International Search Report and Written Opinion for corresponding International Application No. PCT/US2014/024757, dated Jul. 11, 2014, 15 pages.
International Search Report and Written Opinion for corresponding International Application No. PCT/US2014/050001, dated Nov. 18, 2014, 9 pages.
International Search Report and Written Opinion for corresponding International Patent Application No. PCT/US2012/048344, dated Feb. 28, 2013, 9 pages.
International Search Report and Written Opinion for corresponding International Patent Application No. PCT/US2012/048347, dated Dec. 18, 2012, 8 pages.
International Search Report and Written Opinion for corresponding International Patent Application No. PCT/US2012/048380, dated Feb. 27, 2013, 9 pages.
International Search Report and Written Opinion for corresponding International Patent Application No. PCT/US2012/048382, dated Feb. 27, 2013, 9 pages.
International Search Report and Written Opinion dated Feb. 16, 2015, for corresponding International Application No. PCT/US2014/063931, 14 pages.
International Search Report and Written Opinion, for corresponding International Application No. PCT/US2014/021369, dated Jul. 2, 2014, 14 pages.
International Search Report and Written Opinion, for corresponding International Application No. PCT/US2014/022610, dated Jul. 10, 2014, 12 pages.
International Search Report and Written Opinion, dated Feb. 11, 2015, for corresponding International Application No. PCT/US2014/064616, 20 pages.
Japanese Office Action with English Translation dated Jun. 30, 2015, for corresponding JP Application No. 2014-523020, 15 pages.
Japanese Office Action with English Translation dated Mar. 31, 2015, for corresponding JP Application No. 2014-523014, 9 pages.
Japanese Office Action with English Translation, dated Dec. 16, 2014, for corresponding JP Application No. 2014-523013, 11 pages.
Luke et al., "Apparatus, Method and Article for Authentication, Security and Control of Portable Charging Devices and Power Storage Devices, Such as Batteries," Office Action dated Jan. 6, 2014, for U.S. Appl. No. 14/017,090, 19 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Authentication, Security and Control of Power Storage Devices, Such as Batteries, Based on User Profiles," Office Action dated May 11, 2015, for U.S. Appl. No. 13/559,010, 26 pages.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," Notice of Allowance dated Aug. 3, 2015, for U.S. Appl. No. 13/559,038, 13 pages.
Luke et al., "Apparatus, Method and Article for Authentication, Security and Control of Power Storage Devices, Such as Batteries," Office Action dated Aug. 19, 2014, for U.S. Appl. No. 13/559,038, 14 pages.
Luke et al., "Apparatus, Method and Article for Authentication, Security and Control of Power Storage Devices, Such as Batteries," Office Action dated Aug. 21, 2014, for U.S. Appl. No. 14/023,344, 13 pages.
Luke et al., "Apparatus, Method and Article for Authentication, Security and Control of Power Storage Devices, Such as Batteries," Office Action dated Feb. 25, 2014, for U.S. Appl. No. 14/023,344, 12 pages.
Luke et al., "Apparatus, Method and Article for Authentication, Security and Control of Power Storage Devices, Such as Batteries," Office Action dated Feb. 26, 2014, for U.S. Appl. No. 13/559,038, 13 pages.
Luke et al., "Apparatus, Method and Article for Authentication, Security and Control of Power Storage Devices, Such as Batteries," Office Action dated Jun. 19, 2015, for U.S. Appl. No. 14/023,344, 9 pages.
Luke et al., "Apparatus, Method and Article for Authentication, Security and Control of Power Storage Devices, Such as Batteries," U.S. Appl. No. 14/023,344, filed Sep. 10, 2013, 59 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Collection, Charging and Distributing Power Storage Devices, Such as Batteries," Notice of Allowance dated Jun. 8, 2015, for U.S. Appl. No. 13/559,314, 12 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Apparatus, Method and Article for Redistributing Power Storage Devices, Such as Batteries, Between Collection Charging and Distribution Machines," U.S. Appl. No. 13/559,091, filed Jul. 26, 2012, 69 pages.
Luke et al., "Apparatus, Method and Article for Redistributing Power Storage Devices, Such as Batteries, Between Collection, Charging and Distribution Machines," Office Action dated Mar. 13, 2015, for U.S. Appl. No. 13/559,091, 33 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Apparatus, Method and Article for Reserving Power Storage Devices at Reserving Power Storage Device Collection, Charging and Distribution Machines," Office Action dated Jun. 23, 2015, for U.S. Appl. No. 13/559,064, 32 pages.
Luke et al., "Detectible Indication of an Electric Motor Vehicle Standby Mode," Notice of Allowance for U.S. Appl. No. 13/646,320, dated Apr. 10, 2014, 8 pages.
Luke et al., "Detectible Indication of an Electric Motor Vehicle Standby Mode," Office Action for U.S. Appl. No. 13/646,320, dated May 30, 2013, 13 pages.
Luke et al., "Detectible Indication of an Electric Motor Vehicle Standby Mode," U.S. Appl. No. 13/646,320, filed Oct. 5, 2012, 41 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Drive Assembly for Electric Device," U.S. Appl. No. 13/650,392, filed Oct. 12, 2012, 43 pages.

(56) References Cited

OTHER PUBLICATIONS

Luke et al., "Drive Assembly for Electric Powered Device," U.S. Appl. No. 61/546,411, filed Oct. 12, 2011, 18 pages.
Luke et al., "Dynamically Limiting Vehicle Operation for Best Effort Economy," Office Action for U.S. Appl. No. 13/559,264, dated Aug. 14, 2013, 21 pages.
Luke et al., "Dynamically Limiting Vehicle Operation for Best Effort Economy," Office Action for U.S. Appl. No. 13/559,264, dated Aug. 19, 2014, 26 pages.
Luke et al., "Dynamically Limiting Vehicle Operation for Best Effort Economy," Office Action for U.S. Appl. No. 13/559,264, dated Feb. 12, 2014, 24 pages.
Luke et al., "Dynamically Limiting Vehicle Operation for Best Effort Economy," Office Action for U.S. Appl. No. 13/559,264, dated Jan. 21, 2015, 31 pages.
Luke et al., "Dynamically Limiting Vehicle Operation for Best Effort Economy," U.S. Appl. No. 61/511,880, filed Jul. 26, 2011, 52 pages.
Luke et al., "Dynamically Limiting Vehicle Operation for Best Effort Economy," Office Action for U.S. Appl. No. 13/559,264, dated Jun. 15, 2015, 36 pages.
Luke et al., "Electric Device Drive Assembly and Cooling System," U.S. Appl. No. 61/615,144, filed Mar. 23, 2012, 43 pages.
Luke et al., "Modular System for Collection and Distribution of Electric Storage Devices," U.S. Appl. No. 14/202,589, filed Mar. 10, 2014, 76 pages.
Luke et al., "Modular System for Collection and Distribution of Electric Storage Devices," U.S. Appl. No. 61/789,065, filed Mar. 15, 2013, 76 pages.
Luke et al., "Portable Electrical Energy Storage Device," U.S. Appl. No. 61/872,126, filed Aug. 30, 2013, 39 pages.
Luke et al., "Thermal Management of Components in Electric Motor Drive Vehicles," Office Action dated Apr. 2, 2014, for U.S. Appl. No. 13/559,259, 11 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," U.S. Appl. No. 61/647,941, filed May 16, 2012, 47 pages.
Luke, "Apparatus, Method and Article for Changing Portable Electrical Power Storage Device Exchange Plans," U.S. Appl. No. 14/204,587, filed Mar. 11, 2014, 56 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," Office Action for U.S. Appl. No. 14/017,081, dated Dec. 31, 2014, 59 pages.
Luke, "Apparatus, Method and Article for Providing Information Regarding a Vehicle Via a Mobile Device," Office Action for U.S. Appl. No. 14/017,081, dated Jan. 30, 2014, 36 pages.
Luke, "Apparatus, Method and Article for Providing Information Regarding a Vehicle Via a Mobile Device," Office Action for U.S. Appl. No. 14/017,081, dated Jul. 21, 2014, 42 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Luke, "Apparatus, Method and Article for Providing Information Regarding a Vehicle Via a Mobile Device," Office Action dated Jul. 15, 2015, for U.S. Appl. No. 14/017,081, 61 pages.
Microchip, "AN885: Brushless DC (BLDC) Motor Fundamentals," Microchip Technology Inc., 2003, 19 pages.
Park, "A Comprehensive Thermal Management System Model for Hybrid Electric Vehicles," dissertation, The University of Michigan, 2011, 142 pages.

Taylor et al., "Apparatus, Method and Article for Physical Security of Power Storage Devices in Vehicles," Notice of Allowance for U.S. Appl. No. 13/559,054, dated May 30, 2013, 32 pages.
Taylor et al., "Apparatus, Method and Article for Physical Security of Power Storage Devices in Vehicles," Office Action for U.S. Appl. No. 13/559,054, dated Dec. 3, 2012, 11 pages.
Taylor et al., "Apparatus, Method and Article for Physical Security of Power Storage Devices in Vehicles," Office Action dated Dec. 10, 2014, for U.S. Appl. No. 14/012,845, 13 pages.
Taylor et al., "Apparatus, Method and Article for Physical Security of Power Storage Devices in Vehicles," U.S. Appl. No. 14/012,845, filed Aug. 28, 2013, 64 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Physical Security of Power Storage Devices in Vehicles," Office Action dated Jun. 23, 2015, for U.S. Appl. No. 14/012,845, 11 pages.
Taylor et al., "Apparatus, Method and Article for Providing Vehicle Event Data," U.S. Appl. No. 61/901,660, filed Nov. 8, 2013, 58 pages.
Wu et al., "Apparatus, Method and AR TI CLE for a Power Storage Device Compartment," Office Action for U.S. Appl. No. 13/559,125, dated Jun. 16, 2015, 30 pages.
Wu et al., "Apparatus, Method and Article for a Power Storage Device Compartment," Office Action for U.S. Appl. No. 13/559,125, dated Feb. 24, 2014, 28 pages.
Wu et al., "Apparatus, Method and Article for a Power Storage Device Compartment," Office Action for U.S. Appl. No. 13/559,125, dated Sep. 9, 2014, 28 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Power Storage Device Failure Safety," Office Action for U.S. Appl. No. 14/071,134, dated Feb. 12, 2014, 14 pages.
Wu et al., "Apparatus, Method and Article for Power Storage Device Failure Safety," Office Action dated Jun. 9, 2014, for U.S. Appl. No. 14/071,134, 15 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Notice of Allowance dated Apr. 13, 2015, for U.S. Appl. No. 14/071,134, 10 pages.
Wu et al., "Apparatus, Method and Article for Providing Information Regarding Availability of Power Storage Devices at a Power Storage Device Collection, Charging and Distribution Machine," Office Action dated Mar. 5, 2014, for U.S. Appl. No. 14/022,140, 8 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Locations of Power Storage Device Collection, Charging and Distribution Machines," Notice of Allowance dated Jul. 10, 2014, for U.S. Appl. No. 13/559,333, 9 pages.
Wu et al., "Apparatus, Method and Article for Providing Locations of Power Storage Device Collection, Charging and Distribution Machines," Notice of Allowance dated Nov. 25, 2014, for U.S. Appl. No. 14/022,147, 5 pages.
Wu et al., "Apparatus, Method and Article for Providing Locations of Power Storage Device Collection, Charging and Distribution Machines," Office Action for U.S. Appl. No. 13/559,333, dated Jul. 3, 2013, 14 pages.

(56) References Cited

OTHER PUBLICATIONS

Wu et al., "Apparatus, Method and Article for Providing Locations of Power Storage Device Collection, Charging and Distribution Machines," Office Action dated Aug. 6, 2014, for U.S. Appl. No. 14/022,147, 17 pages.

Wu et al., "Apparatus, Method and Article for Providing Locations of Power Storage Device Collection, Charging and Distribution Machines," Office Action dated Mar. 5, 2014, for U.S. Appl. No. 14/022,147, 12 pages.

Wu et al., "Apparatus, Method and Article for Providing Locations of Power Storage Device Collection, Charging and Distribution Machines," Office Action dated Nov. 19, 2013, for U.S. Appl. No. 14/022,147, 10 pages.

Wu et al., "Apparatus, Method and Article for Providing Locations of Power Storage Device Collection, Charging and Distribution Machines," Office Action dated Nov. 27, 2013, for U.S. Appl. No. 13/559,333, 19 pages.

Wu et al., "Apparatus, Method and Article for Providing Locations of Power Storage Device Collection, Charging and Distribution Machines," U.S. Appl. No. 14/022,147, filed Sep. 9, 2013, 56 pages.

Wu et al., "Apparatus, Method and Article for Providing Locations of Power Storage Device Collection, Charging and Distribution Machines," U.S. Appl. No. 61/601,949, filed Feb. 22, 2012, 56 pages.

Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance dated Jun. 30, 2014, for U.S. Appl. No. 14/022,140, 5 pages.

Wu et al., "Apparatus, Method and Article for Providing to a User Device Information Regarding Availability of Portable Electrical Energy Storage Devices at a Portable Electrical Storage Device Collection, Charging and Distribution Machine," U.S. Appl. No. 14/511,137, dated Oct. 9, 2014, 56 pages.

Wu et al., "Apparatus, Method and Article for Security of Vehicles," Office Action dated Oct. 2, 2014, for U.S. Appl. No. 13/671,144, 20 pages.

Wu et al., "Apparatus, Method and Article for Security of Vehicles," U.S. Appl. No. 61/557,176, filed Nov. 8, 2011, 37 pages.

Wu et al., "Battery Configuration for an Electric Vehicle," U.S. Appl. No. 61/716,388, filed Oct. 19, 2012, 37 pages.

Wu, "Battery Configuration for an Electric Vehicle," U.S. Appl. No. 14/057,405, filed Oct. 18, 2013, 38 pages.

\* cited by examiner

Vehicle Diagnostic Report

Based on the vehicle diagnostic information stored with your battery, you may want to consider:

1: Replacing your tail light

2: Replacing your break pads

[ Acknowledged ]

*FIG. 4B*

Receive the vehicle diagnostic data from a memory device attached to the portable electrical energy storage device on which the vehicle diagnostic data is stored Display the information on a display of the portable electrical energy storage device collection, charging and distribution machine

APPARATUS, METHOD AND ARTICLE FOR PROVIDING VEHICLE DIAGNOSTIC DATA

CROSS REFERENCE TO RELATED APPLICATIONS

This application is a continuation of U.S. patent application Ser. No. 14/179,442, entitled APPARATUS, METHOD AND ARTICLE FOR PROVIDING VEHICLE DIAGNOSTIC DATA, filed Feb. 12, 2014, which is a divisional of U.S. patent application Ser. No. 14/022,134, entitled APPARATUS, METHOD AND ARTICLE FOR PROVIDING VEHICLE DIAGNOSTIC DATA, filed Sep. 9, 2013, issued as U.S. Pat. No. 8,862,304, which is a continuation of Ser. No. 13/559,390, entitled APPARATUS, METHOD AND ARTICLE FOR PROVIDING VEHICLE DIAGNOSTIC DATA, filed Jul. 26, 2012, issued as U.S. Pat. No. 8,996,212, which claims the benefit of U.S. Patent Application No. 61/511,900, entitled APPARATUS, METHOD AND ARTICLE FOR COLLECTION, CHARGING AND DISTRIBUTING POWER STORAGE DEVICES, SUCH AS BATTERIES, filed Jul. 26, 2011, U.S. Patent Application No. 61/647,936, entitled APPARATUS, METHOD AND ARTICLE FOR COLLECTION, CHARGING AND DISTRIBUTING POWER STORAGE DEVICES, SUCH AS BATTERIES, filed May 16, 2012, U.S. Patent Application No. 61/534,753 entitled APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES, filed Sep. 14, 2011, U.S. Patent Application No. 61/534,761, entitled APPARATUS, METHOD AND ARTICLE FOR AUTHENTICATION, SECURITY AND CONTROL OF POWER STORAGE DEVICES SUCH AS BATTERIES, filed Sep. 14, 2011, U.S. Patent Application No. 61/534,772, entitled APPARATUS, METHOD AND ARTICLE FOR AUTHENTICATION, SECURITY AND CONTROL OF POWER STORAGE DEVICES, SUCH AS BATTERIES, BASED ON USER PROFILES, Sep. 14, 2011, U.S. Patent Application No. 61/511,887, entitled THERMAL MANAGEMENT OF COMPONENTS IN ELECTRIC MOTOR DRIVE VEHICLES, filed Jul. 26, 2011, U.S. Patent Application No. 61/647,941, entitled THERMAL MANAGEMENT OF COMPONENTS IN ELECTRIC MOTOR DRIVE VEHICLES, filed May 16, 2012, U.S. Patent Application No. 61/511,880, entitled DYNAMICALLY LIMITING VEHICLE OPERATION FOR BEST EFFORT ECONOMY, filed Jul. 26, 2011, U.S. Patent Application No. 61/557,170, entitled APPARATUS, METHOD, AND ARTICLE FOR PHYSICAL SECURITY OF POWER STORAGE DEVICES IN VEHICLES, filed Nov. 8, 2011, U.S. Patent Application No. 61/581,566, entitled APPARATUS, METHOD AND ARTICLE FOR A POWER STORAGE DEVICE COMPARTMENT, filed Dec. 29, 2011, U.S. Patent Application No. 61/601,404, entitled APPARATUS, METHOD AND ARTICLE FOR PROVIDING VEHICLE DIAGNOSTIC DATA, filed Feb. 21, 2012, U.S. Patent Application No. 61/601,949, entitled APPARATUS, METHOD AND ARTICLE FOR PROVIDING LOCATIONS OF POWER STORAGE DEVICE COLLECTION, CHARGING AND DISTRIBUTION MACHINES, filed Feb. 22, 2012, and U.S. Patent Application No. 61/601,953, entitled APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE, filed Feb. 22, 2012.

BACKGROUND

Technical Field

The present disclosure generally relates to providing vehicle diagnostic data and, more particularly, to providing vehicle diagnostic data using electrical power storage devices (e.g., secondary batteries, supercapacitors or ultracapacitors), which may be suitable for use in a variety of fields or applications, for instance transportation and non-transportation uses.

Description of the Related Art

Personal transportation vehicles such as combustion engine powered scooters and/or motorbikes are ubiquitous in many places, for example in the many large cities of Asia. Such scooters and/or motorbikes tend to be relatively inexpensive, particularly compared to automobiles, cars or trucks. Cities with high numbers of combustion engine scooters and/or motorbikes also tend to be very densely populated and suffer from high levels of air pollution. When new, many combustion engine scooters and/or motorbikes are equipped with a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating a variety of diseases (e.g., various reports tie air pollution to emphysema, asthma, pneumonia, cystic fibrosis as well as various cardiovascular diseases). Such diseases take large numbers of lives and severely reduce the quality of life of countless others.

There are a wide variety of uses or applications for portable electrical energy storage devices. One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

As the popularity of hybrid and electric powered vehicles continues to increase, so will the need to maintain these vehicles in a convenient and cost effective manner.

BRIEF SUMMARY

A vehicle diagnostic data storage system may be summarized as including at least one controller; and at least one memory device configured to be coupled to the at least one controller, wherein the at least one memory device is attached to an electrical energy storage device configured to provide power to a vehicle, and wherein the controller is configured to: receive diagnostic data regarding the vehicle; and store at least some of the diagnostic data in the memory device.

The at least one memory device may be configured to be coupled to the at least one controller when the electrical energy storage device is operably placed in the vehicle. The at least one controller may be attached to the electrical energy storage device. The at least one memory device may be coupled to the at least one controller. The electrical energy storage device may be a portable electrical energy storage device. The at least one controller may be further configured to receive the diagnostic data regarding the vehicle from a vehicle diagnostic system of the vehicle. The at least one controller may be further configured to wirelessly receive the diagnostic data regarding the vehicle from the vehicle diagnostic system. The at least one memory device may be configured to be wirelessly coupled to the at least one controller. The at least one controller may be further configured to enable the at least some diagnostic data stored on the at least one memory device to be provided to an external device. The at least one controller may be further configured to: receive information regarding authentication of an external device to which to provide the at least some diagnostic data stored on the at least one memory device; and make a determination regarding enabling the at least some diagnostic data stored on the at least one memory device to be provided to the external device, based on the information regarding authentication. The at least one controller may be configured to receive the information regarding authentication via a wireless signal transmitted from the external device. The external device may be a portable electrical energy storage device collection, charging and distribution machine.

The vehicle diagnostic data storage system may further include a wireless communications module coupled to the at least one memory device, and wherein the wireless communications module is configured to enable the at least some diagnostic data stored on the at least one memory device to be provided wirelessly to an external device. The diagnostic data may include at least some information regarding one or more of: status or condition of the vehicle, condition of an engine of the vehicle, one or more electrical systems of the vehicle, health of the vehicle, oil level of the vehicle, brake pad condition of the vehicle, status of one or more vehicle lights, engine temperature of the vehicle, mileage of the vehicle, one or more fluid levels of the vehicle, condition or status of the electrical energy storage device, and current odometer reading of the vehicle. The memory device may be removably attached to the electrical energy storage device.

A method of operating a portable electrical energy storage device collection, charging and distribution machine may be summarized as including detecting presence of a portable electrical energy storage device configured to provide power to a vehicle; receiving vehicle diagnostic data regarding the vehicle from the portable electrical energy storage device; and providing information from the portable electrical energy storage device collection, charging and distribution machine based on the received vehicle diagnostic data.

The detecting presence of a portable electrical energy storage device may include detecting presence of the portable electrical energy storage device in the portable electrical energy storage device collection, charging and distribution machine. The detecting the presence of the portable electrical energy storage device in the portable electrical energy storage device collection, charging and distribution machine may include detecting an operable physical connection between a diagnostic data storage system of the portable electrical energy storage device and an input of the portable electrical energy storage device collection, charging and distribution machine once the portable electrical energy storage device is placed in the portable electrical energy storage device collection, charging and distribution machine. The detecting presence of the portable electrical energy storage device may include detecting presence of the portable electrical energy storage device via a wireless signal received from the portable electrical energy storage device. The receiving vehicle diagnostic data regarding the vehicle from the portable electrical energy storage device may include receiving the vehicle diagnostic data from a memory device attached to the portable electrical energy storage device on which the vehicle diagnostic data is stored. The providing information from the portable electrical energy storage device collection, charging and distribution machine based on the received vehicle diagnostic data may include displaying the information on a display of the portable electrical energy storage device collection, charging and distribution machine. The displaying the information on a display of the portable electrical energy storage device collection, charging and distribution machine may include displaying the information on the display during a transaction at the portable electrical energy storage device collection, charging and distribution machine involving the portable electrical energy storage device. The providing information from the portable electrical energy storage device collection, charging and distribution machine based on the received vehicle diagnostic data may include communicating the information to a mobile device of a user associated with the vehicle. The providing information from the portable electrical energy storage device collection, charging and distribution machine based on the received vehicle diagnostic data may include communicating the information to a server computing system. The provided information from the portable electrical energy storage device collection, charging and distribution machine may include notifications regarding potential problems with the vehicle based on the diagnostic data. The provided information from the portable electrical energy storage device collection, charging and distribution machine may further include instructions for resolving the potential problems with the vehicle.

The method of operating a portable electrical energy storage device collection, charging and distribution machine may further include displaying information regarding availability of particular vehicle parts at the portable electrical energy storage device collection, charging and distribution machine based on the received vehicle diagnostic data.

An electrical energy storage device may be summarized as including a battery cell; a battery cell housing; and a diagnostic data storage system attached to the battery cell housing configured to receive and store diagnostic data of a vehicle that the electrical energy storage device is configured to power.

The electrical energy storage device may be a portable electrical energy storage device. The diagnostic data storage system may be attached to an inside of the battery cell housing. The diagnostic data storage system may be attached to an outside of the battery cell housing. The diagnostic data storage system may be configured to communicate the stored diagnostic data of the vehicle to an external device. The diagnostic data storage system may be configured to wirelessly communicate the stored diagnostic data of the vehicle to an external device. The external device may be a portable electrical energy storage device collection, charging and distribution machine. The diagnostic data storage system may include a controller coupled to a memory device, wherein the controller is configured to: receive diagnostic data regarding the vehicle; store at least some of the diagnostic data in the memory device; and enable the at least some diagnostic data stored in the memory device to be provided to an external device.

A non-transitory computer readable storage medium may be summarized as having computer executable instructions thereon that, when executed, cause a processor to perform: receiving data from a portable electrical energy storage device configured to power the vehicle; and providing information based on the received data to a user associated with the vehicle.

The computer executable instructions, when executed, may further cause the processor to perform detecting presence of the portable electrical energy storage device at a portable electrical energy storage device collection, charging and distribution machine. The data may include one or more of: vehicle diagnostic data regarding the vehicle, user profile information, vehicle profile information, security codes, credentials, security certificates, passwords, a subscription level of a user, demographic information of a user, information regarding user vehicle locations, telematic user vehicle information, telemetric user vehicle information, information regarding portable electrical energy storage device charge capacity, information regarding route information of users, and historic data. The data may include vehicle diagnostic data regarding the vehicle and the receiving the data from the portable electrical energy storage device may include receiving the data from a memory device attached to the portable electrical energy storage device on which the vehicle diagnostic data is stored. The providing information based on the received data may include displaying the information on a display of a portable electrical energy storage device collection, charging and distribution machine in which the portable electrical energy storage device has been placed and in response to the portable electrical energy storage device having been placed in the collection, charging and distribution machine.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 4B is an illustration of example information displayed on a user interface screen regarding vehicle diagnostic data received from the diagnostic data storage system of FIG. 3 and FIG. 4A, according to one non-limiting illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise"

and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to gel lead-acid, absorbed glass mat lead acid, nickel cadmium alloy, nickel-zinc, nickel metal hydride or lithium ion battery cells.

The headings and Abstract of the Disclosure provided herein are for convenience only and do not interpret the scope or meaning of the embodiments.

Figure 1:
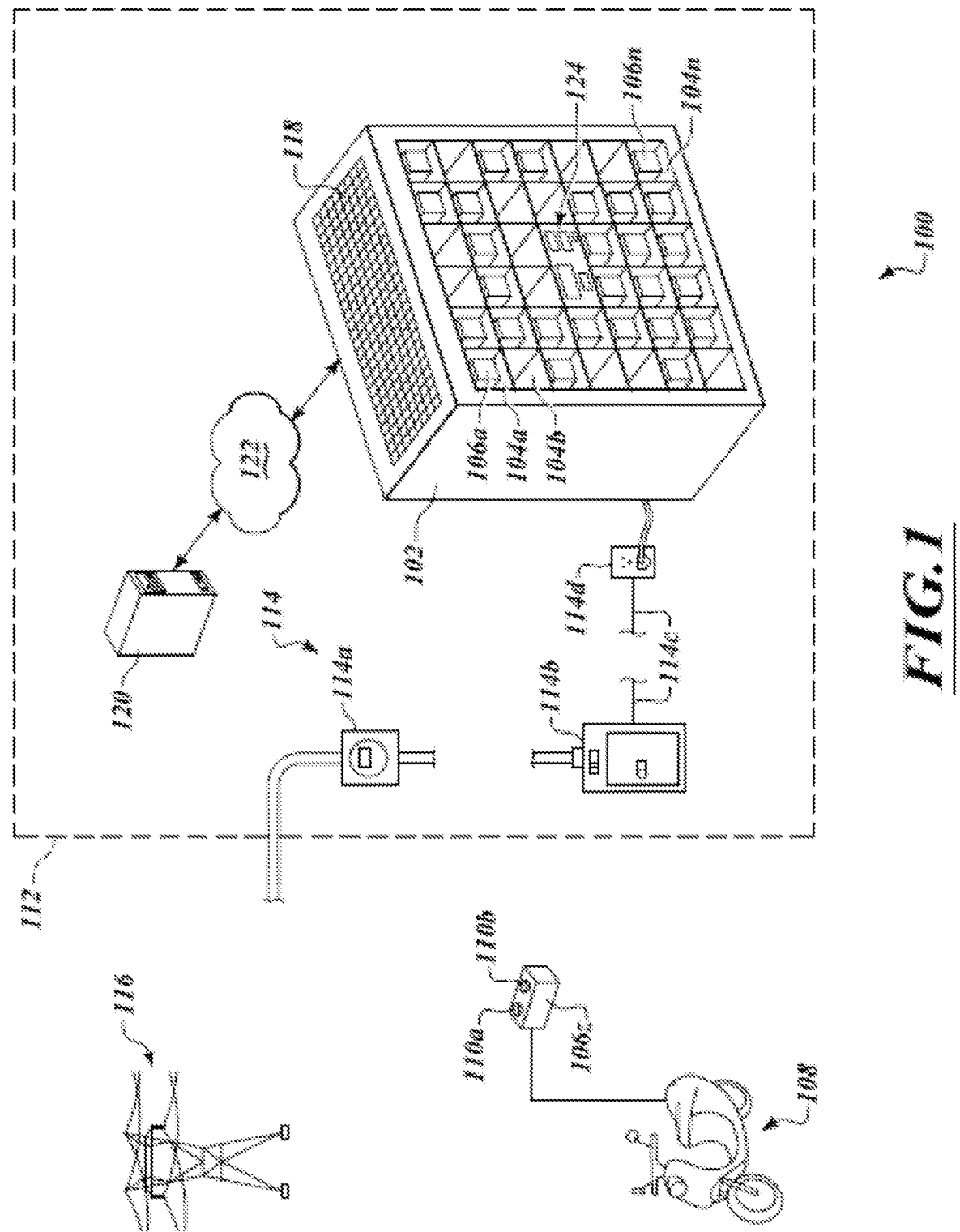
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells), supercapacitors or ultracapacitors (e.g., array of ultracapacitor cells). For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing. As the portable electrical energy storage devices 106 may be lent, leased, and/or rented out to the public, it is desirable to provide vehicle diagnostic data to the user of the vehicle in which portable electrical energy storage device 106z is currently being used, for example, when the user exchanges or drops off portable electrical energy storage device 106z at a collection, charging and distribution machine 102. Systems and methods for providing vehicle diagnostic data using memory devices removably or fixedly attached to power storage devices, are described in more detail below with reference to FIGS. 2-7, and are useful in the overall system for collection, charging and distribution of portable electrical energy storage devices 106 described herein.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. The ability to quickly charge while maintaining existing or otherwise limited rated electrical service is addressed in U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
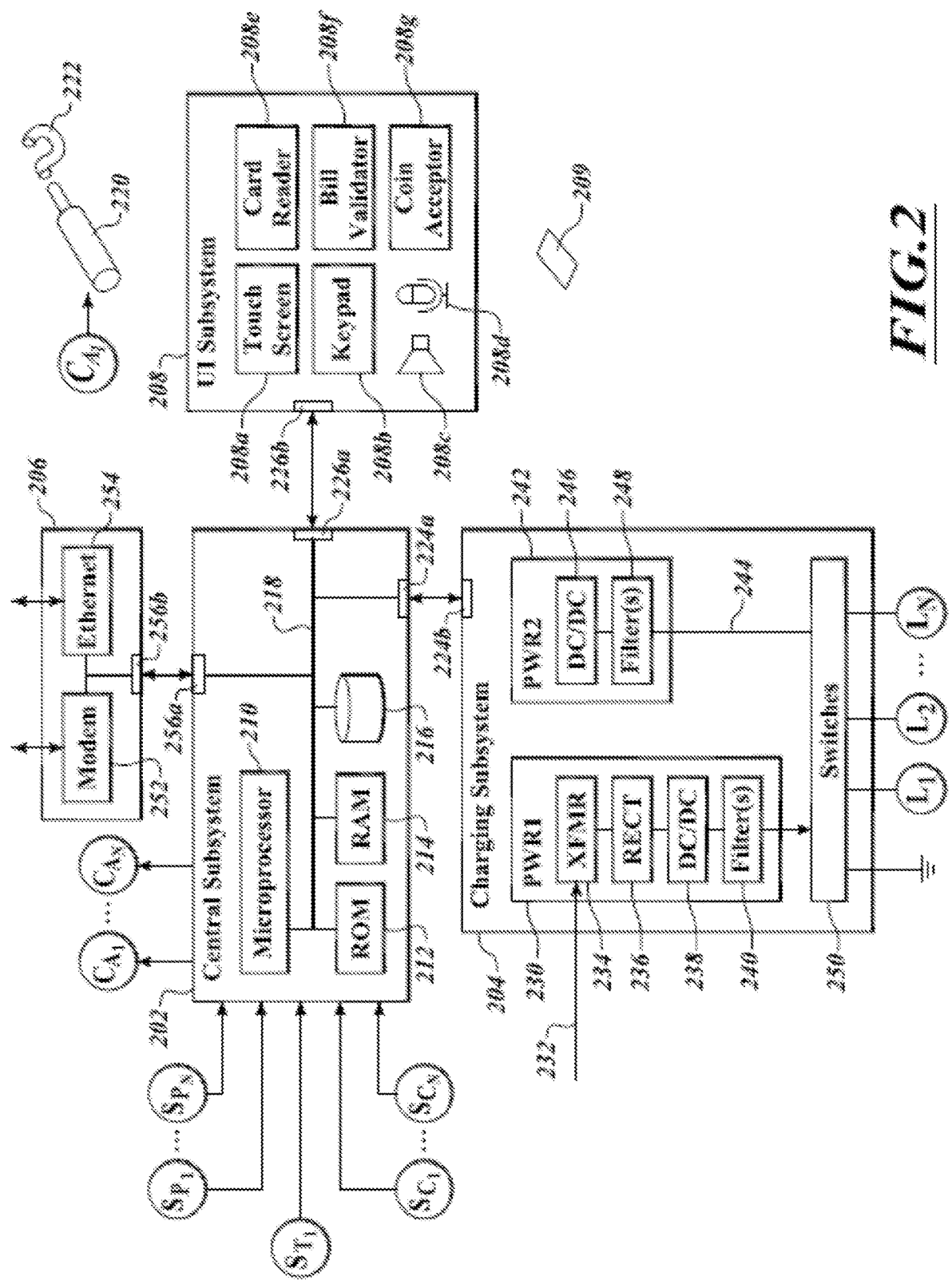
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, and distribute portable energy storage devices. Specific operation of the collection, charging and distribution machine 102 is described herein and also below with reference to various flow diagrams (FIGS. 7-10) in the context of being an external device to charge the portable electrical energy storage devices 106 and provide information based on vehicle diagnostic data received from the portable electrical energy storage devices 106.

The controller 210 may use RAM 214 in a conventional fashion, for volatile storage of instructions, data, etc. The controller 210 may use data store 216 to log or retain information, for example, vehicle diagnostic data received from the portable electrical energy storage devices 106 and telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104, or contact with a memory device of the portable electrical power storage device 106. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also, for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1$, $L_2$-$L_N$.

The communications subsystem 206 may additionally include one or more communications modules or components which facilitate communications with the various components of a back end or back office system 120 (FIG. 1) and/or various components of the portable electrical power storage devices 106. The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. For example, the communications subsystem 206 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including the portable electrical energy storage devices 106. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses. The card reader 208e may also be able to read information encoded in a non-transitory medium carried by the portable electrical energy storage devices 106, and may also include RFID transponders, transceivers, NFC chips and/or other communication devices to communicate information to the portable electrical energy storage devices 106 (e.g., for authentication of the portable electrical energy storage devices 106 and/or authentication of the collection, charging and distribution machine 102 to the portable electrical energy storage devices 106).

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3:
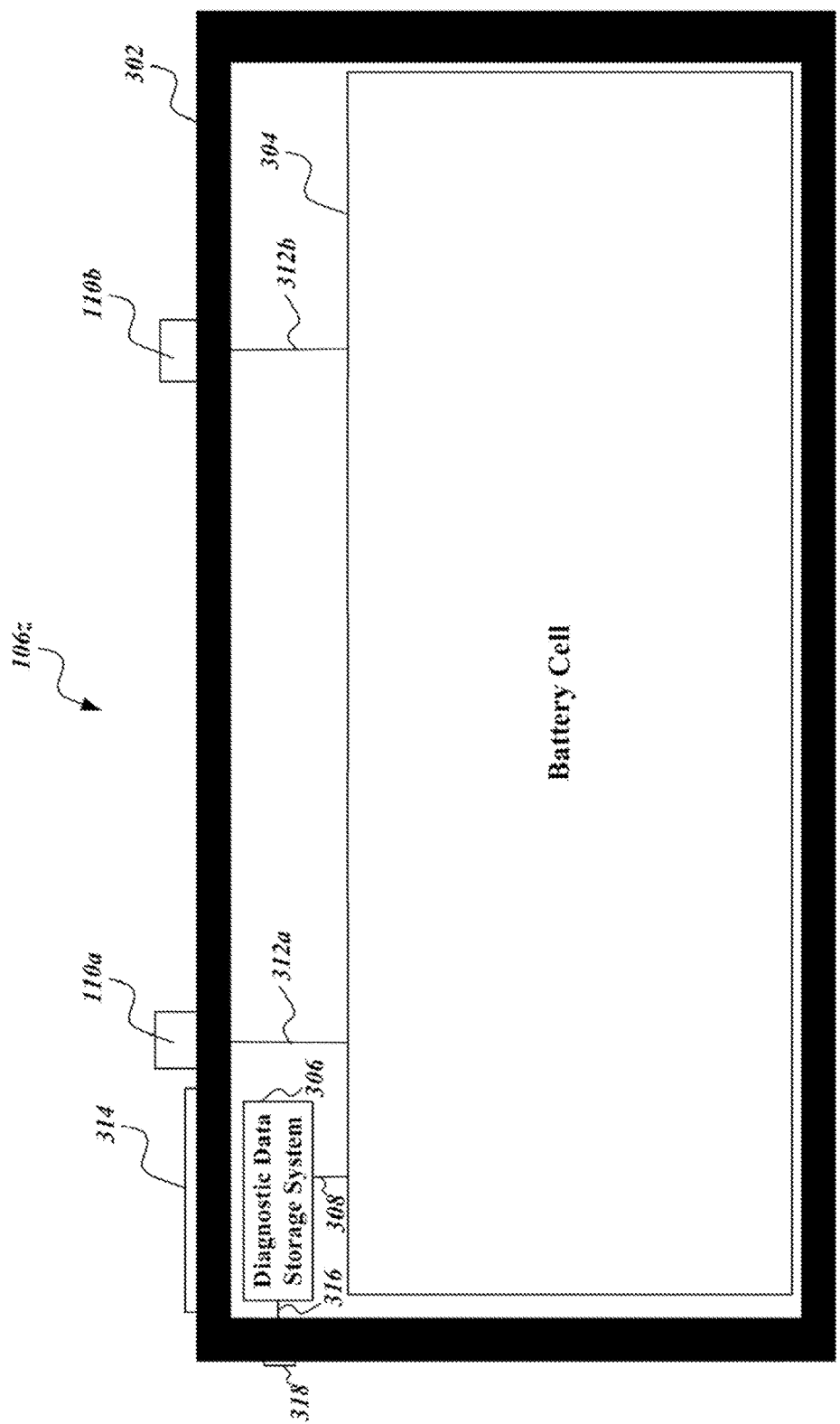
FIG. 3 is a block diagram of the portable electrical energy storage device of FIG. 1, according to one non-limiting illustrated embodiment.

FIG. 3 is a block diagram of the portable electrical energy storage device 106z of FIG. 1, according to one non-limiting illustrated embodiment.

Shown is a portable electrical energy storage device housing 302, electrical terminals 110a, 110b, a battery cell 304, diagnostic data storage system 306, a secure access panel 314 and a diagnostic data storage system connection port 318. The battery cell 304 is any rechargeable type of electrochemical cell that converts stored chemical energy into electrical energy. As described above, the electrical terminals 110a, 110b are accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same through conductive terminal connections 312a and 312b to the battery cell 304. While illustrated in FIG. 3 as posts, the electrical terminals 110a and 110b may take any other form which is accessible from an exterior of the portable electrical energy storage device 106z, including electrical terminals positioned within slots in the battery housing 302.

The diagnostic data storage system 306 is attached (fixedly or removably) directly or indirectly to an interior of the housing 302 and is operably coupled to the diagnostic data storage system connection port 318 via communications line 316 which travels through the housing 302 to the system connection port 318 that is accessible from the exterior of the portable electrical energy storage device 106z. The communications line 316 is configured to receive vehicle diagnostic data from external sources (e.g., a vehicle diagnostic system) through the diagnostic data storage system connection port 318 and communicate such data to the diagnostic data storage system 306 for storage in the diagnostic data storage system 306. For example, the communications line 316 is configured to receive vehicle diagnostic data from a vehicle while the portable electrical energy storage device 106z is operably installed in the vehicle. In other embodiments, the communications line 316 is configured to receive vehicle diagnostic data from a vehicle while the portable electrical energy storage device 106z is not operably installed in the vehicle. For example, the portable electrical energy storage device 106z may be connected the communications line 316 to a diagnostic system of the vehicle and be able to receive diagnostic data from the vehicle, while the electrical terminals 110 of the portable electrical energy storage device 106z are not operably connected to the vehicle (such as when the portable electrical energy storage device 106z is in the process of being installed or uninstalled, or is placed in the vehicle temporarily for the purpose of downloading vehicle diagnostic data, but not for powering the vehicle).

Such diagnostic data includes, but is not limited to, information regarding one or more of: status or condition of the vehicle or engine systems, such as data available through on-board diagnostics interfaces such as ALDL, OBD-1, OBD-1.5, OBD-II, EOBD, EOBD2, JOBD, and ADR. Specific examples of diagnostic data includes information regarding the status or condition of a vehicle systems or subsystems, engine systems or subsystems, one or more electrical systems of the vehicle, health of the vehicle, oil level of the vehicle, brake pad condition of the vehicle, one or more vehicle lights, engine temperature of the vehicle, mileage of the vehicle, one or more fluid levels of the vehicle, the electrical energy storage device, and current odometer reading of the vehicle.

The diagnostic data storage system connection port 318 may be operably connected to a vehicle diagnostic system or may be configured to be operably connected to any number of vehicle subsystems configured to output diagnostic data regarding the particular corresponding vehicle subsystem. The diagnostic data storage system connection port 318 is configured to be compatible with one or more output ports of the respective vehicle diagnostic system or vehicle subsystem to which it is connected. In some embodiments, the diagnostic data storage system connection port 318 is operably coupled to a vehicle diagnostic system (e.g., the vehicle diagnostic system 418 shown in FIG. 4) as the portable electrical energy storage device 106z is operably placed or installed in the vehicle. For example, the diagnostic data storage system connection port 318 may be positioned on the exterior of the portable electrical energy storage device 106z housing 302 such that it aligns and connects with a corresponding output port of the vehicle diagnostic system 418 (shown in FIG. 4) when the portable electrical energy storage device 106z is properly placed or installed in the vehicle. The communications line 316 is also configured to send vehicle diagnostic data to external sources (e.g., a portable electrical energy storage device collection, charging and distribution machine 102, a mobile device, a server, etc.) from the diagnostic data storage system 306 through the diagnostic data storage system connection port 318.

The diagnostic data storage system 306 is operably coupled to the battery cell 304 via one or more power lines 308 in a manner such that the diagnostic data storage system 306 may receive power for operation of the diagnostic data storage system 306 to store vehicle diagnostic data. In other embodiments, the diagnostic data storage system 306 may receive power from other external sources or may be a system which does not require its own power to store the diagnostic data.

The access panel 314 is located on the housing 302 and is configured to provide access to the diagnostic data storage system 306 for inspection, diagnosis, replacement, and/or repair of the diagnostic data storage system 306 and/or any components of the diagnostic data storage system 306. The access panel 314 may also include a lock, be tamper resistant or include other security elements to limit access to the diagnostic data storage system 306. The access panel 314 may also include weather proofing components such as a seal or other protective components to protect the diagnostic data storage system 306 from external elements. In other embodiments, the diagnostic data storage system 306 may instead be fixedly or removably attached to an exterior of the housing 302. In such instances, the communications line would not travel through the housing 302. However, in such embodiments, the power line 308 to the battery cell 304, if present, would travel through the housing 302.

In some embodiments, the diagnostic data storage system 306 is configured to receive and/or send vehicle diagnostic data wirelessly to or from an external device. For example, the diagnostic data storage system 306 may be configured to receive vehicle diagnostic data wirelessly from the vehicle or external diagnostics system and/or send stored vehicle diagnostic data wirelessly to the portable electrical energy storage device collection, charging and distribution machine 102 or other remote device, such as a portable computer or smartphone. In such embodiments, the communications line 316 and the diagnostic data storage system connection port 318 may or may not be present as the diagnostic data storage system 306 may be configured to send and/or receive vehicle diagnostic data wirelessly instead of, or in addition to, being configured to send and/or receive vehicle diagnostic data via the communications line 316 and the diagnostic data storage system connection port 318.

The housing 302 is constructed of a polymer or other durable material of sufficient thickness to protect the battery cell 304 and diagnostic data storage system 306 from outside elements and tampering. For example the walls of the housing may be at least approximately 0.25 inch thick and completely surround the battery cell 304 and diagnostic data storage system 306 (except for, in some embodiments, a small vent hole in the housing) such that the battery cell 304 and diagnostic data storage system 306 cannot be accessed without a key or other specialized tool to open the locked access panel 314.

The housing 302 may provide a protection to prevent or deter tampering, and may be formed of suitably strong and resilient materials (e.g., ABS plastic). Such may not only prevent or deter tampering, but may leave a visible indication of any tampering attempts. For example, the housing 302 may include a strong outer layer of a first color (e.g., black) within an inner layer of a second color (e.g., fluorescent orange) there beneath. Such will render attempts to cut through the housing 302 visibly apparent.

Figure 4A:
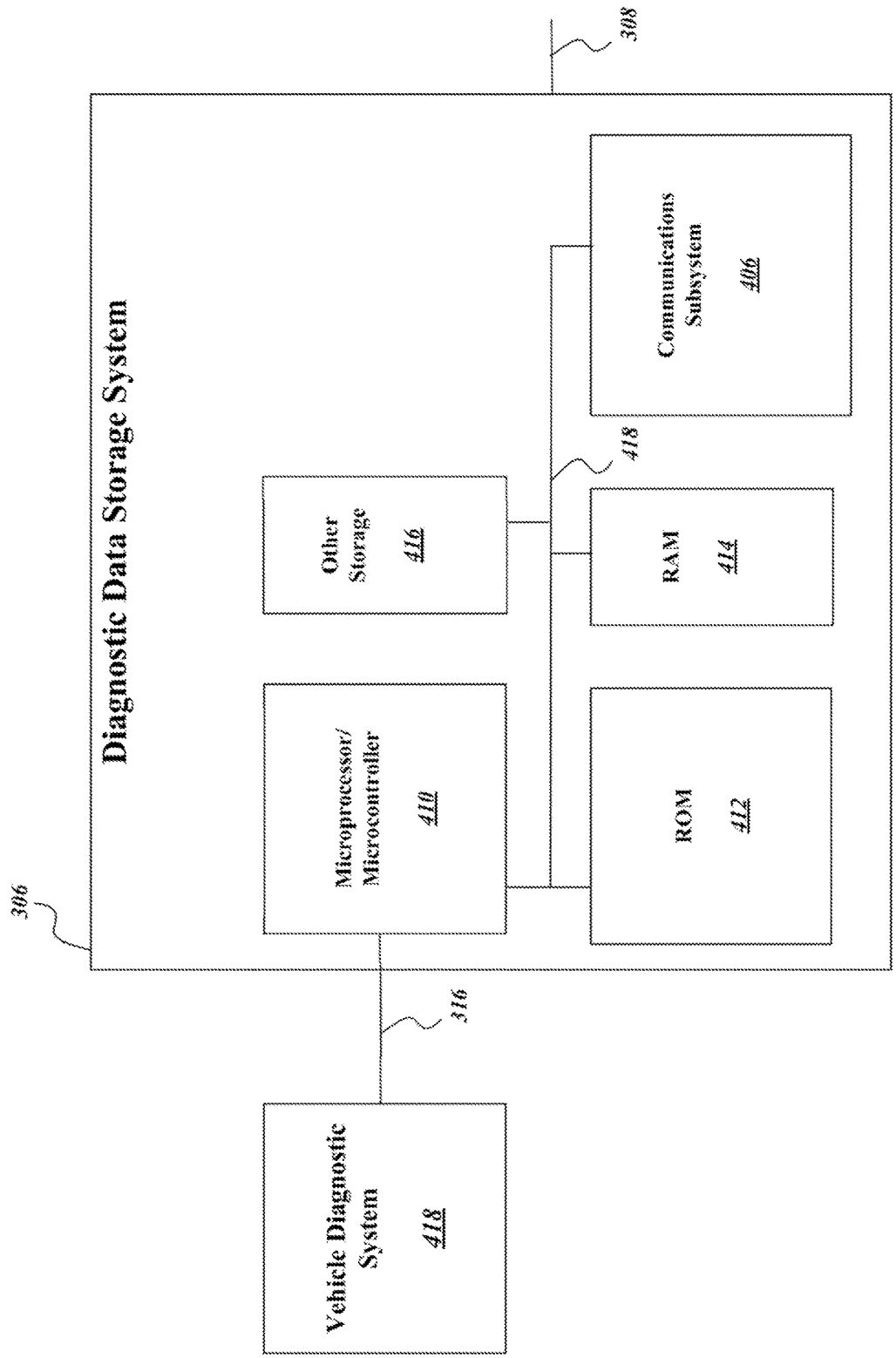
FIG. 4A is a schematic view of the diagnostic data storage system of FIG. 3 coupled to a vehicle diagnostic system, according to one non-limiting illustrated embodiment.

FIG. 4A is a schematic view of the diagnostic data storage system 306 of FIG. 3 coupled to a vehicle diagnostic system 418, according to one non-limiting illustrated embodiment.

The diagnostic data storage system 306 includes a controller 410, a communications subsystem 406, read only memory (ROM) 412, random access memory (RAM) 414 and other storage 416.

The controller 410, for example is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The diagnostic data storage system 306 may also include one or more non-transitory processor- or computer-readable storage media, for example read only memory (ROM) 412, random access memory (RAM) 414, and other storage 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The diagnostic data storage system 306 may include one or more buses 418 (only one illustrated) coupling various components together, for example one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the diagnostic data storage system 306 to receive, store and send vehicle diagnostic data, such as data received from the vehicle diagnostic system. The diagnostic data may be stored in one or more of the ROM 412, RAM 414 and other storage 416 in a variety of forms and formats including, but not limited to a lookup table, a set of records in a database, etc. The diagnostic data may be stored in a format, or converted to and then stored in a format in compliance with a standard format for vehicle diagnostic data or other format compatible or readable by various external devices. Also, various metadata related to the diagnostic data may also be stored in one or more of the ROM 412 and other storage 416, including but not limited to: associations or indications of associations of the diagnostic data with a particular vehicle and/or user; date and time information associated with particular diagnostic data, vehicle information associated with the diagnostic data, categories or types of the diagnostic data, vehicle part information associated with parts needing replaced based on the diagnostic data, etc. Specific operation of the diagnostic data storage system 306 is described herein and also below with reference to various flow diagrams (FIGS. 5-10).

The controller 410 may use RAM 414 in a conventional fashion, for volatile storage of instructions, data, etc. The controller 410 may use data store 416 to log or retain information, for example, information regarding user profile information, vehicle profile information, security codes, credentials, security certificates, passwords, the subscription level of users, demographic information of users such as (income level, gender, age, net worth, marital status, etc.), information regarding user vehicle locations and telematic and/or telemetric user vehicle information, vehicle diagnostic data, information regarding portable electrical energy storage device charge capacity, information regarding route information of users, historic data, etc. The instructions are executable by the controller 410 to control operation of the diagnostic data storage system 306 in response to input from remote and/or external systems such as those of external devices including but not limited to: the vehicle diagnostic system 418; charging devices; vehicles; user identification devices (cards, electronic keys, etc.); portable electrical energy device collection, charging and distribution machines; collection, charging and distribution machine service systems; user mobile devices; user vehicles; and end user or operator input.

The controller 410 may also receive signals from various sensors and/or components of an external device via the communications subsystem 206 of collection, charging and distribution machine 102. This information may include information that characterizes or is indicative of the authenticity, authorization level, operation, status, or condition of such components.

The communications subsystem 406 may include one or more communications modules or components which facilitates communications with the various components of external devices (e.g., such as to receive vehicle diagnostic data from the vehicle diagnostic system 418) and also the various components of the collection, charging and distribution machine 102 of FIG. 1 (e.g., such as to send vehicle diagnostic data, profile and/or vehicle profile information, and/or historic data stored by the diagnostic data storage system 306, receive software updates or data updates of user profile and/or vehicle profile information) and one or more user mobile communication devices, such that data may be exchanged between the devices for authentication purposes. Such diagnostic data and software updates, and data updates of user profile and/or vehicle profile information may include information received from or originating from (either directly or indirectly) an external device or system (e.g., a user's mobile device) or from other external systems such as via web sites configured to prompt for and/or accept such data from a user, web servers, collection charging and distribution machines, collection charging and distribution machine managements systems, other network nodes or locations, etc. These instructions and/or other data may include information that may be used to automatically adjust settings of the vehicle or make other modifications to the vehicle by the vehicle diagnostic system or other vehicle system when the corresponding electrical energy storage device is placed in or is in (or at which point it becomes in) communication with the vehicle via the communications subsystem 406. These settings of the vehicle or other modifications to the vehicle may include settings regarding, but not limited to, one or more of: user preference settings, user profile preference settings, engine settings, electrical system settings, seat settings, steering settings, braking system settings, turn signal settings, navigation system settings, electrical energy storage device usage preference settings, electrical energy storage device usage level settings, electrical energy storage device usage limit settings, driving preferences, limits or preferences on vehicle electrical energy use, electrical energy storage device type preference settings, vehicle security settings, electrical energy storage device security settings, vehicle user interface settings, vehicle maintenance settings, vehicle maintenance reminder settings, vehicle usage authorization settings, electrical energy storage device usage authorization settings, vehicle communication system preference settings, reminder settings, collection, charging and distribution machine location preferences, route settings, vehicle warning or alarm settings, vehicle range or distance settings, vehicle option settings, etc.

The communications subsystem 406 may provide wired and/or wireless communications. The communications subsystem 406 may include one or more ports, wireless receivers, wireless transmitters or wireless transceivers to provide wireless signal paths to the various remote components or systems. The communications subsystem 406 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems or one or more Ethernet or other types of communications cards or components for doing so. The remote communications subsystem 406 may include one or more bridges or routers suitable to handle network traffic including switched packet type communications protocols (TCP/IP), Ethernet or other networking protocols.

The controller 410 may be also configured to receive information regarding the vehicle and/or user with which the vehicle diagnostic system 418 is associated and store the received diagnostic data accordingly. For example, diagnostic data for a variety of particular vehicles may be stored in ROM 412 by the processor and associated with the corresponding vehicle in metadata stored in ROM 412. The controller 410 may be configured to receive requests for the diagnostic data from various external devices, and in response, provide such requested data, or indicate that such data is not available. In some embodiments, the controller 410 may be configured to perform search, edit, sort, delete and other database functionalities to manage the stored vehicle diagnostic data and identify and retrieve particular requested vehicle diagnostic data. The controller 410 may be configured to identify or authenticate various external devices before providing such vehicle diagnostic data by verifying codes, credentials or other information received from external devices with stored information. In some embodiments, the controller and/or communications subsystem 406 is configured to encrypt and/or decrypt information communicated between the diagnostic data storage system 306 and external devices (e.g., between the diagnostic data storage system 306 and the portable electrical energy storage device collection, charging and distribution machine 102 or user mobile device).

In some embodiments, some of the components of the diagnostic data storage system 306 shown in FIG. 4A may not be present or may be located outside the diagnostic data storage system 306. For example, in some embodiments, the diagnostic data storage system 306 may comprise a memory device such as the ROM 412 configured to store vehicle diagnostic data while the other components shown in FIG. 4A (e.g., the controller 410 and communications subsystem 406) are not present or are located outside the diagnostic data storage system 306 (e.g., are instead part of the vehicle diagnostic system 418).

The vehicle diagnostic system 418 may be one or more diagnostic systems of a vehicle and is configured to track and/or store and communicate vehicle diagnostic data. Such diagnostic data includes, but is not limited to, information regarding one or more of: status or condition of the vehicle, condition of an engine of the vehicle, one or more electrical systems of the vehicle, health of the vehicle, oil level of the vehicle, brake pad condition of the vehicle, status of one or more vehicle lights, engine temperature of the vehicle, mileage of the vehicle, one or more fluid levels of the vehicle, condition or status of the electrical energy storage device, and current odometer reading of the vehicle.

The power line 308 is configured to provide power for operation of one or more of the various components of the diagnostic data storage system including the controller 410, a communications subsystem 406, read only memory (ROM) 412, random access memory (RAM) 414 and other storage 416. For example, the power line 308 may be operably coupled to a power source such as the battery cell 304 of the portable electrical energy storage device 106*z* (as shown in FIG. 3) and/or another power source located in the vehicle.

FIG. 4B is an illustration of example information displayed on a user interface screen 420 regarding vehicle diagnostic data received from the diagnostic data storage system 306 of FIG. 3 and FIG. 4A, according to one non-limiting illustrated embodiment.

For example, the information shown in FIG. 4B may be displayed on a user interface screen 420 of the portable electrical energy storage device collection, charging and distribution machine 102 after the user places the portable electrical energy storage device 106*z* in the portable electrical energy storage device collection, charging and distribution machine 102. In one embodiment, once the user places the portable electrical energy storage device 106*z* in the portable electrical energy storage device collection, charging and distribution machine 102, a connection is established between the portable electrical energy storage device collection, charging and distribution machine 102 and the portable electrical energy storage device 106*z* (wirelessly and/or via the via the diagnostic data storage system connection port 318). The portable electrical energy storage device collection, charging and distribution machine 102 then reads vehicle diagnostic data stored on the diagnostic data storage system 306 of the portable electrical energy storage device 106*z* and provides information regarding the diagnostic data to the user. FIG. 4B shows one example of providing such information regarding the diagnostic data read from the diagnostic data storage system 306 of the portable electrical energy storage device 106*z*. For example, shown in FIG. 4B is a vehicle diagnostic report displaying a suggestion 424 to consider replacing the vehicle tail light and a suggestion 426 to consider replacing the vehicle brake pads. This information is provided based on the diagnostic data read from the diagnostic data storage system 306 indicating excessive brake pad wear and a faulty tail light. Additional related information may be provided including, but not limited to: information regarding availability of particular vehicle parts at the portable electrical energy storage device collection, charging and distribution machine 102 that may be useful in resolving an identified potential problem, instructional information regarding resolving an identified problem, location information of where to locate replacement vehicle parts, time remaining until a system check is recommended, etc. Also shown is a selectable button or icon 428 that the user may select to acknowledge the user has seen the information and to continue to a next screen or quit.

The information shown in FIG. 4B may be displayed on a screen of the portable electrical energy storage device collection, charging and distribution machine 102 or otherwise communicated to a user as part of, or independently from, the process of exchanging or returning a portable electrical energy storage device 106*z* at the portable electrical energy storage device collection, charging and distribution machine 102 by the user. For example, a user may stop at the portable electrical energy storage device collection, charging and distribution machine 102 solely to check on the status or condition of the vehicle by obtaining information regarding the vehicle diagnostic data stored on the diagnostic data storage system 306 without needing to exchange, drop off or even remove the portable electrical energy storage device 106*z* from the vehicle in some embodiments (such as in embodiments where the vehicle diagnostic data is communicated wirelessly from the diagnostic data storage system 306 to the portable electrical energy storage device collection, charging and distribution machine 102).

In some embodiments, the information shown in FIG. 4B may be displayed on a user interface screen 420 of a mobile device of a user associated with the vehicle currently using (or that had previously used) the portable electrical energy storage device 106z. For example, once within wireless communications range of the diagnostic data storage system 306, the diagnostic data storage system 306 may authenticate the wireless mobile device and automatically push the stored vehicle diagnostic data to the mobile device, or upon request from the mobile device for the vehicle diagnostic data. The diagnostic data storage system 306 may also authenticate the user associated with the mobile device as being a user associated with the vehicle and/or the diagnostic data storage system 306. For example, such authentication information regarding the association of the user with the vehicle and/or the diagnostic data storage system 306 may be communicated to the diagnostic data storage system 306 from the portable electrical energy storage device collection, charging and distribution machine 102 when the portable electrical energy storage device 106z having the diagnostic data storage system 306 is retrieved from the portable electrical energy storage device collection, charging and distribution machine 102 by the user who has been identified by the portable electrical energy storage device collection, charging and distribution machine 102.

Once the portable electrical energy storage device 106z is placed in the portable electrical energy storage device collection, charging and distribution machine 102 in the process of a user returning or exchanging the portable electrical energy storage device 106z at the portable electrical energy storage device collection, charging and distribution machine 102, and the information regarding the vehicle diagnostic data has been provided to the user or otherwise utilized, the portable electrical energy storage device collection, charging and distribution machine 102 may initiate a deletion of the vehicle diagnostic data from the diagnostic data storage system 306 or cause the stored vehicle identification data to be able to be overwritten (e.g., to make room for storage of vehicle diagnostic data of other vehicles in which the portable electrical energy storage device 106z will be used). In some embodiments, the currently stored vehicle diagnostic data may be deleted or caused to be able to be overwritten by the diagnostic data storage system 306 or vehicle diagnostic system 418 upon re-connection of the diagnostic data storage system 306 to the vehicle diagnostic system 418, or upon connection to a different vehicle than that which is associated with the currently stored vehicle diagnostic data on the diagnostic data storage system 306.

Figure 5:
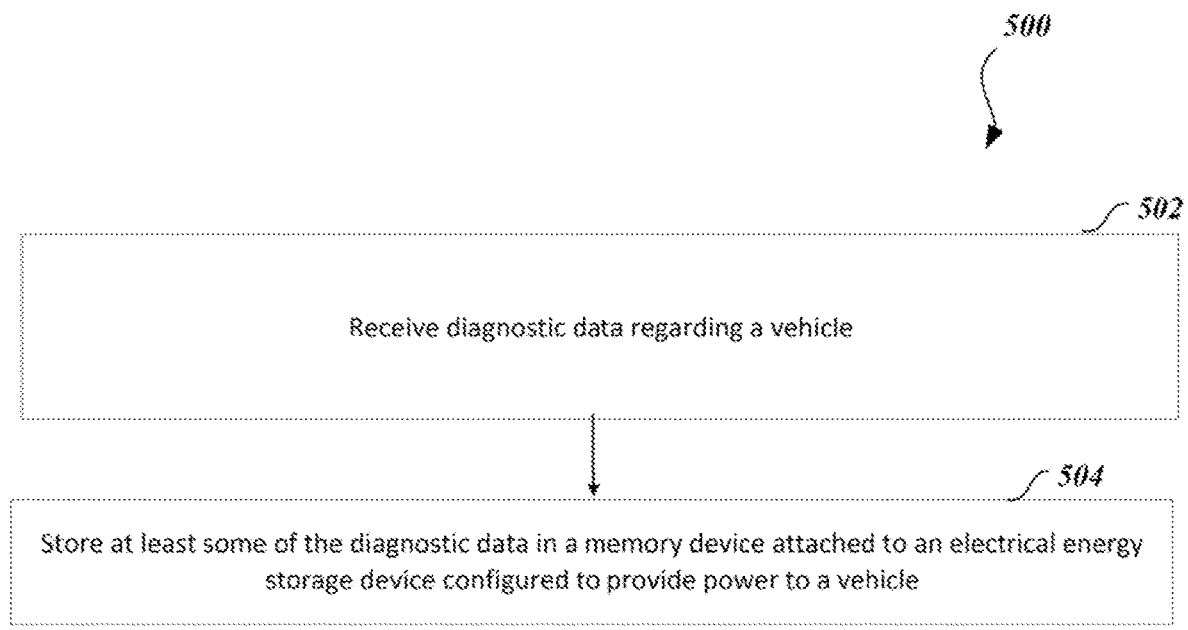
FIG. 5 is a flow diagram showing a high level method of operating the diagnostic data storage system of FIGS. 3 and 4A, according to one non-limiting illustrated embodiment.

FIG. 5 shows a high level method 500 of operating the diagnostic data storage system 306 of FIGS. 3 and 4A, according to one non-limiting illustrated embodiment.

At 502, the diagnostic data storage system 306 receives diagnostic data regarding a vehicle.

At 504, the diagnostic data storage system 306 stores at least some of the diagnostic data in a memory device attached to an electrical energy storage device configured to provide power to a vehicle.

Figure 6:
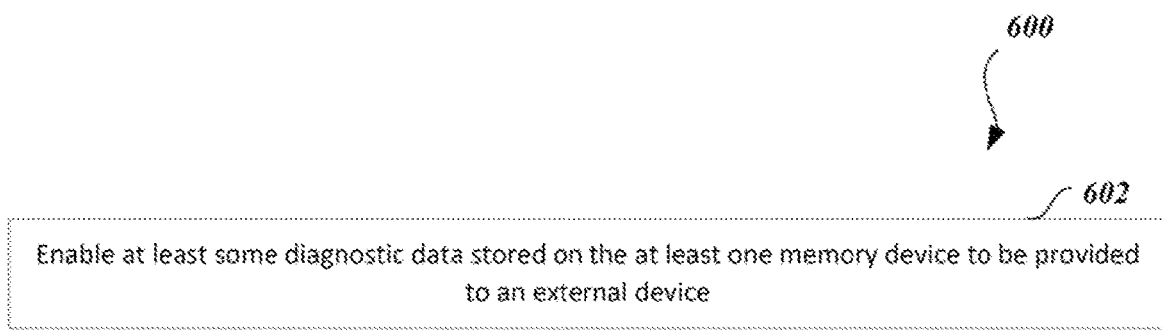
FIG. 6 is a flow diagram showing a low level method of operating the diagnostic data storage system of FIGS. 3 and 4A, according to one non-limiting illustrated embodiment, including enabling data to be provided to an external device, useful in the method of FIG. 5.

FIG. 6 shows a low level method 600 of operating the diagnostic data storage system 306 of FIGS. 3 and 4A, according to one non-limiting illustrated embodiment, including enabling data to be provided to an external device, useful in the method of FIG. 5.

Figure 7:
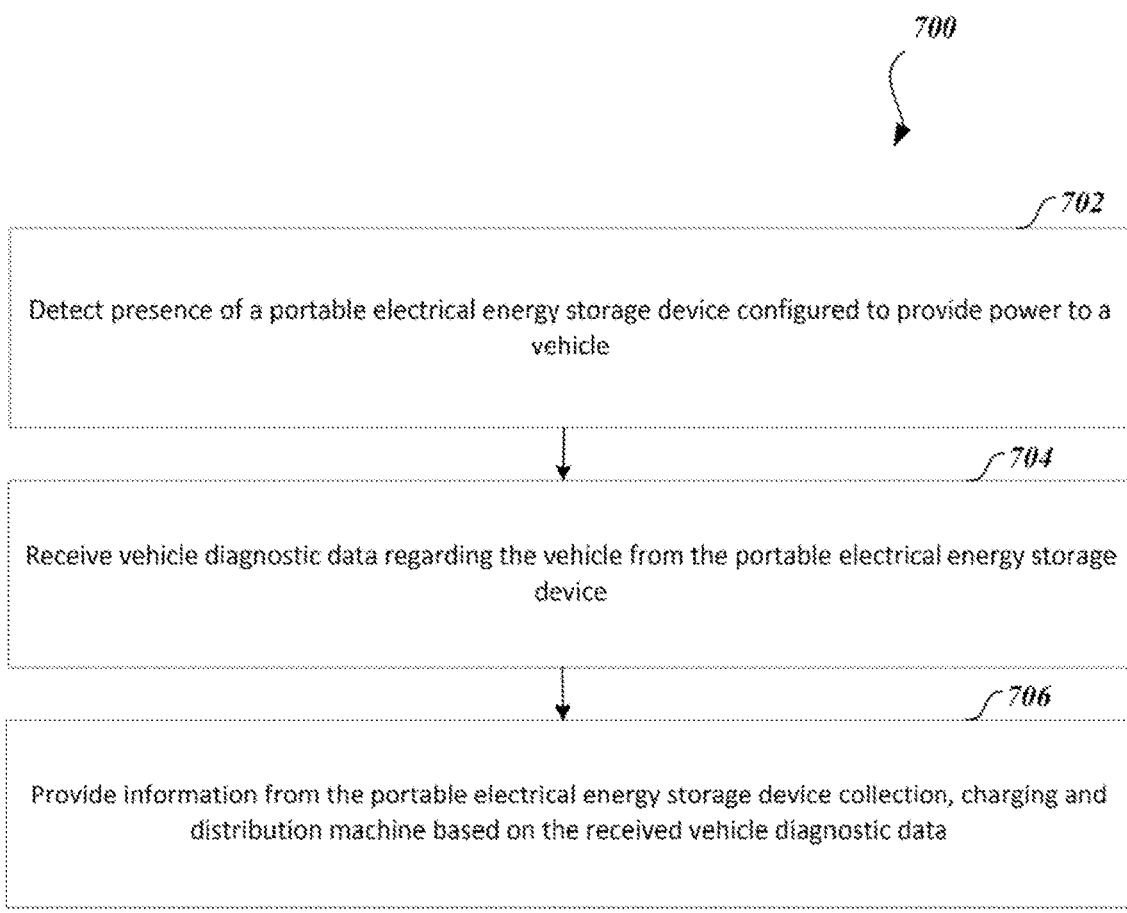
FIG. 7 is a flow diagram showing a high level method of operating a portable electrical energy storage device collection, charging and distribution machine of FIGS. 1 and 2, according to one non-limiting illustrated embodiment.

At 602, the diagnostic data storage system 306 enables at least some diagnostic data stored on the at least one memory device (e.g., at least some of the diagnostic data stored on the at least one memory device in the method 500) to be provided to an external device FIG. 7 shows a high level method 700 of operating the portable electrical energy storage device collection, charging and distribution machine 102 of FIGS. 1 and 2, according to one non-limiting illustrated embodiment.

At 702, the portable electrical energy storage device collection, charging and distribution machine 102 detects presence of a portable electrical energy storage device configured to provide power to a vehicle.

At 704, the portable electrical energy storage device collection, charging and distribution machine 102 receives vehicle diagnostic data regarding the vehicle from the portable electrical energy storage device.

At 706, the portable electrical energy storage device collection, charging and distribution machine 102 provides information from the portable electrical energy storage device collection, charging and distribution machine 102 based on the received vehicle diagnostic data.

Figure 8:
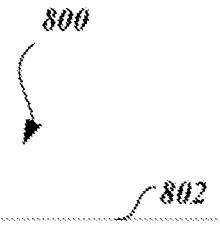
FIG. 8 is a flow diagram showing a low level method of operating the portable electrical energy storage device collection, charging and distribution machine of FIGS. 1 and 2, according to one non-limiting illustrated embodiment, including receiving the vehicle diagnostic data from a memory device, useful in the method of FIG. 7.

FIG. 8 shows a low level method 800 of operating the portable electrical energy storage device collection, charging and distribution machine 102 of FIGS. 1 and 2, according to one non-limiting illustrated embodiment, including receiving the vehicle diagnostic data from a memory device, useful in the method of FIG. 7.

At 802, the portable electrical energy storage device collection, charging and distribution machine 102 receives the vehicle diagnostic data from a memory device attached to the portable electrical energy storage device on which the vehicle diagnostic data is stored.

Figure 9:
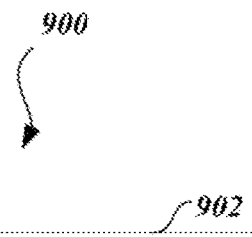
FIG. 9 is a flow diagram showing a low level method of operating the portable electrical energy storage device collection, charging and distribution machine of FIGS. 1 and 2, according to one non-limiting illustrated embodiment, including displaying the provided information, useful in the method of FIG. 7.

FIG. 9 shows a low level method 900 of operating the portable electrical energy storage device collection, charging and distribution machine 102 of FIGS. 1 and 2, according to one non-limiting illustrated embodiment, including displaying the provided information, useful in the method of FIG. 7.

At 902, the portable electrical energy storage device collection, charging and distribution machine 102 displays the information on a display of the portable electrical energy storage device collection, charging and distribution machine 102.

Figure 10:
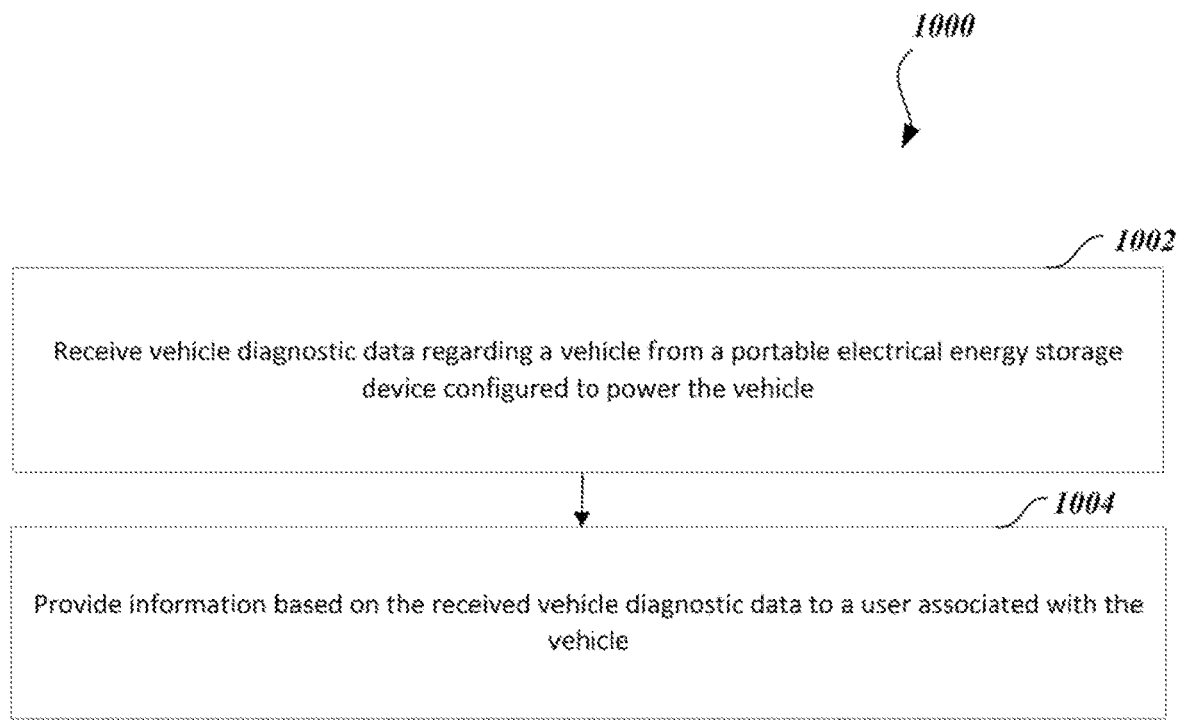
FIG. 10 is a flow diagram showing a high level method of operating a portable electrical energy storage device collection, charging and distribution machine of FIGS. 1 and 2, according to another non-limiting illustrated embodiment.

FIG. 10 shows a high level method 1000 of operating the portable electrical energy storage device collection, charging and distribution machine 102 of FIGS. 1 and 2, according to another non-limiting illustrated embodiment.

At 1002, the portable electrical energy storage device collection, charging and distribution machine 102 receives vehicle diagnostic data regarding a vehicle from a portable electrical energy storage device configured to power the vehicle.

At 1004, the portable electrical energy storage device collection, charging and distribution machine 102 provides information based on the received vehicle diagnostic data to a user associated with the vehicle (e.g., to a user's mobile device).

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES," and filed Jul. 26, 2011, U.S. provisional patent application Ser. No. 61/647,936, entitled "APPARATUS, METHOD AND ARTICLE FOR COLLECTION, CHARGING AND DISTRIBUTING POWER STORAGE DEVICES, SUCH AS BATTERIES," and filed May 16, 2012, U.S. provisional patent application Ser. No. 61/534,753, entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES," and filed Sep. 14, 2011, U.S. provisional patent application Ser. No. 61/534,761, entitled "APPARATUS, METHOD AND ARTICLE FOR AUTHENTICATION, SECURITY AND CONTROL OF POWER STORAGE DEVICES SUCH AS BATTERIES," and filed Sep. 14, 2011, U.S. provisional patent application Ser. No. 61/534,772, entitled "APPARATUS, METHOD AND ARTICLE FOR AUTHENTICATION, SECURITY AND CONTROL OF POWER STORAGE DEVICES, SUCH AS BATTERIES, BASED ON USER PROFILES," and filed Sep. 14, 2011, U.S. provisional patent application Ser. No. 61/511,887, entitled "THERMAL MANAGEMENT OF COMPONENTS IN ELECTRIC MOTOR DRIVE VEHICLES," and filed Jul. 26, 2011, U.S. provisional patent application Ser. No. 61/647,941, entitled "THERMAL MANAGEMENT OF COMPONENTS IN ELECTRIC MOTOR DRIVE VEHICLES," and filed May 16, 2012, U.S. provisional patent application Ser. No. 61/511,880, entitled "DYNAMICALLY LIMITING VEHICLE OPERATION FOR BEST EFFORT ECONOMY," and filed Jul. 26, 2011, U.S. provisional patent application Ser. No. 61/557,170, entitled "APPARATUS, METHOD, AND ARTICLE FOR PHYSICAL SECURITY OF POWER STORAGE DEVICES IN VEHICLES," and filed Nov. 8, 2011, U.S. provisional patent application Ser. No. 61/581,566, entitled "APPARATUS, METHOD AND ARTICLE FOR A POWER STORAGE DEVICE COMPARTMENT," and filed Dec. 29, 2011, U.S. provisional patent application Ser. No. 61/601,404, entitled "APPARATUS, METHOD AND ARTICLE FOR PROVIDING VEHICLE DIAGNOSTIC DATA," and filed Feb. 21, 2012, U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES," and filed Feb. 22, 2012, and U.S. provisional patent application Ser. No. 61/601,953, entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE," and filed Feb. 22, 2012, U.S. application Ser. No. 13/559,314, filed Jul. 26, 2012, naming Hok-Sum Horace Luke, Matthew Whiting Taylor and Huang-Cheng Hung as inventors, entitled "APPARATUS, METHOD AND ARTICLE FOR COLLECTION, CHARGING AND DISTRIBUTING POWER STORAGE DEVICES, SUCH AS BATTERIES,", U.S. application Ser. No. 13/559,038, filed Jul. 26, 2012, naming Hok-Sum Horace Luke and Matthew Whiting Taylor as inventors, entitled "APPARATUS, METHOD AND ARTICLE FOR AUTHENTICATION, SECURITY AND CONTROL OF POWER STORAGE DEVICES SUCH AS BATTERIES," U.S. application Ser. No. 13/559,264, filed Jul. 26, 2012, naming Hok-Sum Horace Luke and Matthew Whiting Taylor as inventors, entitled "DYNAMICALLY LIMITING VEHICLE OPERATION FOR BEST EFFORT ECONOMY,", U.S. application Ser. No. 13/559,054, filed Jul. 26, 2012, naming Matthew Whiting Taylor, Yi-Tsung Wu, Hok-Sum Horace Luke and Huang-Cheng Hung as inventors, entitled "APPARATUS, METHOD, AND ARTICLE FOR PHYSICAL SECURITY OF POWER STORAGE DEVICES IN VEHICLES,", U.S. application Ser. No. 13/559,343, filed Jul. 26, 2012, naming Yi-Tsung Wu, Matthew Whiting Taylor, Hok-Sum Horace Luke and Jung-Hsiu Chen as inventors, entitled "APPARATUS, METHOD AND ARTICLE FOR PROVIDING INFORMATION REGARDING AVAILABILITY OF POWER STOR- AGE DEVICES AT A POWER STORAGE DEVICE COLLECTION, CHARGING AND DISTRIBUTION MACHINE,", and U.S. application Ser. No. 13/559,064, filed Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and, entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES," which are incorporated herein by reference, in their entireties. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a portable electrical energy storage device collection, charging and distribution machine, the method comprising:
    detecting presence of a portable electrical energy storage device configured to provide power to a vehicle;
    receiving vehicle diagnostic data regarding the vehicle from the portable electrical energy storage device, wherein the vehicle diagnostic data includes vehicle part information associated with a non-battery vehicle part of the vehicle that is determined to be replaced;
    based on the vehicle part information, generating availability information regarding available vehicle parts; and
    displaying the availability information at the collection, charging and distribution machine.

2. The method of claim 1, further comprising detecting presence of the portable electrical energy storage device in the collection, charging and distribution machine.

3. The method of claim 2, further comprising detecting an operable physical connection between a diagnostic data storage system of the portable electrical energy storage device and the collection, charging and distribution machine once the portable electrical energy storage device is placed in the collection, charging and distribution machine.

4. The method of claim 1, further comprising detecting presence of the portable electrical energy storage device via a wireless signal received from the portable electrical energy storage device.

5. The method of claim 1, further comprising receiving the vehicle diagnostic data from a memory device attached to the portable electrical energy storage device on which the vehicle diagnostic data is stored.

6. The method of claim 1, further comprising displaying the availability information on a display of the collection, charging and distribution machine.

7. The method of claim 6, further comprising displaying the availability information on the display during a transaction at the collection, charging and distribution machine involving the portable electrical energy storage device.

8. The method of claim 1, further comprising communicating the availability information to a mobile device associated with the vehicle.

9. The method of claim 1, further comprising communicating the availability information to a server computing system.

10. A non-transitory computer readable storage medium having computer executable instructions thereon that, when executed, cause a processor to:
    detect presence of a portable electrical energy storage device configured to provide power to a vehicle;
    receive vehicle diagnostic data regarding the vehicle from the portable electrical energy storage device, wherein the vehicle diagnostic data includes vehicle part information associated with a non-battery vehicle part of the vehicle that is determined to be replaced;
    based on the vehicle part information, generate availability information regarding available vehicle parts; and
    display the availability information at the collection, charging and distribution machine.

11. The non-transitory computer readable storage medium of claim 10, wherein the computer executable instructions, when executed, further cause the processor to detect presence of the portable electrical energy storage device in the collection, charging and distribution machine.

12. The non-transitory computer readable storage medium of claim 10, wherein the computer executable instructions, when executed, further cause the processor to receive the data from a memory device attached to the portable electrical energy storage device on which the vehicle diagnostic data is stored.

13. The non-transitory computer readable storage medium of claim 10, wherein the computer executable instructions, when executed, further cause the processor to display the availability information on a display of the collection, charging and distribution machine.

14. The non-transitory computer readable storage medium of claim 13, wherein the computer executable instructions, when executed, further cause the processor to display the availability information on the display during a transaction at the collection, charging and distribution machine involving the portable electrical energy storage device.

15. The non-transitory computer readable storage medium of claim 10, wherein the computer executable instructions, when executed, further cause the processor to communicate the availability information to a mobile device associated with the vehicle.

16. The non-transitory computer readable storage medium of claim 10, wherein the computer executable instructions, when executed, further cause the processor to communicate the availability information to a server computing system.

17. A system comprising:
    a memory attached to a portable electrical energy storage device and configured to store vehicle diagnostic data;
    a processor configured to:

receive the vehicle diagnostic data from the portable electrical energy storage device, wherein the vehicle diagnostic data includes vehicle part information associated with a non-battery vehicle part of the vehicle that is determined to be replaced;

based on the vehicle part information, generate availability information regarding available vehicle parts; and display the availability information at the collection, charging and distribution machine.

18. The system of claim 17, wherein the processor is further configured to detect presence of the portable electrical energy storage device in a collection, charging and distribution machine.

19. The system of claim 17, wherein the processor is further configured to communicate the availability information to a mobile device associated with a vehicle.

20. The system of claim 17, wherein the processor is further configured to display the availability information on a display of the collection, charging and distribution machine.

* * * * *